(12) United States Patent
Chtcherbatchenko et al.

(10) Patent No.: US 11,651,473 B2
(45) Date of Patent: May 16, 2023

(54) OUTPUTTING WARPED IMAGES FROM CAPTURED VIDEO DATA

(71) Applicant: Meta Platforms, Inc., Menlo Park, CA (US)

(72) Inventors: Andrei Viktorovich Chtcherbatchenko, Redmond, WA (US); Francis Yunfeng Ge, Kirkland, WA (US); Bo Yin, Seattle, WA (US); Shi Chen, Kirkland, WA (US); Fabian Langguth, Zurich (CH); Johannes Peter Kopf, Seattle, WA (US); Suhib Fakhri Mahmod Alsisan, Bothell, WA (US); Richard Szeliski, Bellevue, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 155 days.

(21) Appl. No.: 16/882,322

(22) Filed: May 22, 2020

(65) Prior Publication Data

US 2021/0366075 A1 Nov. 25, 2021

(51) Int. Cl.
*G06T 3/00* (2006.01)
*G06T 7/73* (2017.01)
*G06T 5/50* (2006.01)

(52) U.S. Cl.
CPC .............. *G06T 3/0093* (2013.01); *G06T 5/50* (2013.01); *G06T 7/73* (2017.01); *G06T 2207/10016* (2013.01); *G06T 2207/30244* (2013.01)

(58) Field of Classification Search
CPC ....... G06T 15/205; G06T 3/0093; G06T 5/50; G06T 7/73; G06T 2207/10016; G06T 2207/30244
See application file for complete search history.

(56) References Cited

U.S. PATENT DOCUMENTS

2012/0188452 A1\* 7/2012 Keiser ................... G06T 13/00
348/559
2013/0265460 A1\* 10/2013 Wu ........................ G06T 5/006
348/222.1

(Continued)

OTHER PUBLICATIONS

H. Huang et al., Trip Synopsis: 60km in 60sec, pub. vol. 35 (2016), No. 7, Computer Graphics Forum © 2016 (Year: 2016).\*

(Continued)

*Primary Examiner* — Mekonen T Bekele

(74) *Attorney, Agent, or Firm* — Baker Botts L.L.P.

(57) ABSTRACT

In one embodiment, a method includes generating an outputted sequence of warped images from a captured sequence of images. Using this captured sequence of images, a computing system may determine one or more three-dimensional locations of object features and a corresponding camera position for each image in the captured sequence of images. Utilizing the camera positions for each image, the computing system may determine a view path representing the perspective of a virtual camera. The computing system may identify one or more virtual camera positions for the virtual camera located on the view path, and subsequently warp one or more images from the sequence of captured images to represent the perspective of the virtual camera at each of the respective virtual camera positions. This results in a sequence of warped images that may be outputted for viewing and interaction on a client device.

20 Claims, 18 Drawing Sheets
(2 of 18 Drawing Sheet(s) Filed in Color)

(56) References Cited

U.S. PATENT DOCUMENTS

| | | | |
|---|---|---|---|
| 2019/0287302 A1* | 9/2019 | Bhuruth | G06F 3/04847 |
| 2020/0026031 A1* | 1/2020 | Li | G02B 7/09 |
| 2021/0142443 A1* | 5/2021 | Eble | H04N 21/816 |
| 2021/0158549 A1* | 5/2021 | Veeravasarapu | G06T 3/0093 |

OTHER PUBLICATIONS

Noah Snavely et al."Finding Paths through the World's Photos" published Aug. 2008, (Year: 2008).*
Huang et al. "Trip Synopsis: 60km in 60sec" Computer Graphics Forum, published 2016 (Year: 2016).*
Fyuse—3D Photos—Apps on Google Play, https://play.google.com/store/apps/details?id=com fyusion.fyuse&hl=enUS, 5 pages.
Lipski C., et al., "Virtual Video Camera: Image-Based Viewpoint Navigation Through Space and Time," Computer Graphics, Jan. 1, 2009, 11 pages.
Snavely N., et al., "Finding Paths through the World's Photos," ACM Transactions on Graphics, vol. 27, No. 3, Aug. 1, 2008, 11 pages.
Snavely N., et al., "Photo Tourism: Exploring Photo Collections in 3D," ACM Transactions on Graphics, Jul. 2006, vol. 25 (3), 12 pages.

* cited by examiner

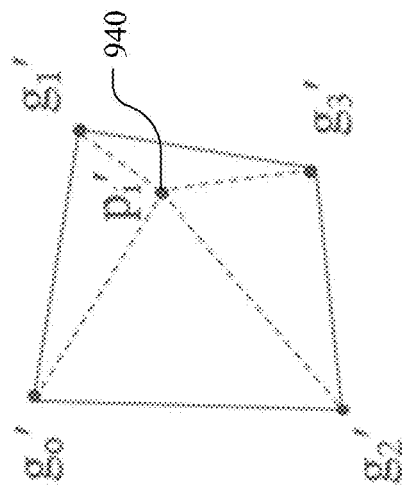
FIG. 9B
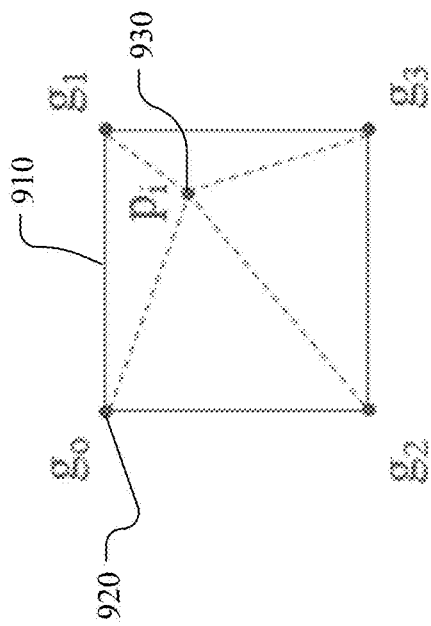
FIG. 9A

OUTPUTTING WARPED IMAGES FROM CAPTURED VIDEO DATA

TECHNICAL FIELD

This disclosure generally relates to outputting a sequence of warped images of an object from captured image data.

BACKGROUND

Online shopping has supplanted the brick and mortar shopping experience for many industries, largely due to the convenience of the shopping experience. With a network-connected device, a consumer can browse, purchase, and ship millions of items from online sellers directly to their door without ever having to leave their homes. In a brick and mortar store, consumers can view and physically interact with displays of products. In contrast, a traditional online seller displays their product inventory via uploaded images and text descriptions. The accessibility, affordability, and convenience of online shopping has led to millions of products, both new and used, offered for sale online, from a variety of sellers ranging from multi-million dollar retailers to individuals. This variety creates an abundance of options that permit consumers to carefully evaluate one or more products prior to making a purchasing decision. Sellers that provide greater detail on their products may be more appealing to consumers that care about the quality of purchased products.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments described herein relate to a method for generating a sequence of warped images intended for use by an online seller to provide an interactive actual view of an available product. Rather than uploading a still-image or a user-captured video of a product, particular embodiments uses one or more of camera positions from a captured sequence of captured images to determine a smooth view path that represents the path of a virtual camera around an object. Utilizing the one or more of camera positions and three-dimensional object features, the computing system warps one or more images to represent the perspective from one or more virtual camera positions located along the view path. This results in a sequence of warped images that may be outputted for viewing and interaction on a wireless device.

Particular embodiments further provide one or more processes for further improving the quality and the production value of the outputted sequence of warped images. Such processes may include gap detection, outlier detection, cropping, or inpainting the sequence of images. Inaccuracies in the collected captured sequence of images (caused either by technological limitations or user error) may reduce the quality and likelihood of successfully generating a sequence of warped images. One or more of these processes are conducted to improve the reliability and quality by removing or adjusting the captured sequence of images and associated data, including the one or more of camera positions and three-dimensional object features.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 9A illustrates an example of projecting the three-dimensional locations of object features depicted in the selected reference camera position onto a mesh.

FIG. 9B illustrates warping a mesh so that the projected points of reference camera position match the projected points of virtual camera position.

DESCRIPTION OF EXAMPLE EMBODIMENTS

Unlike brick and mortar stores where products are stocked on shelves, a user shopping for a product online is limited by the images and descriptions of the product provided by the seller. These often limit the ability of the consumer to inspect the product in an online environment. For example, a potential buyer may wish to interact with a product from multiple angles, for example by rotating the product to inspect its quality prior to purchasing. This is especially useful when purchasing used products, as viewing a used product from multiple angles may permit a potential buyer to inspect wear and damage that may not be visible from a fixed image.

Online sellers often wish to provide as much detail of their products as possible to consumers while minimizing the cost required to do so. While many online retailers describe their products using still images and text descriptions, some online retailers have developed interactive depictions of products for online consumers. Traditional methods for providing these interactive depictions of products online prevent challenges to online sellers, especially those with limited resources. Merely uploading a video of an object captured by a camera often looks unprofessional, as uploaded videos from conventional equipment such as a cell phone camera or webcam may suffer from, for example, sudden, jarring movements as the viewpoint changes throughout a scene, temporal irregularity (e.g., a video may spend a greater length of time capturing a portion of an object, while quickly panning over other portions of the object), or the inability to keep the object of interest in the center of the frame as the video moves throughout a scene. Videos with these deficiencies may appear unprofessional and thus reflects negatively on the seller.

To overcome these deficiencies, sellers oftentimes create a rotatable depiction of a product by using some combination of professional camera equipment and operators, ideal lighting environments, expensive modeling software, and skilled computer-graphics technicians in order to create a video with high-quality production value, or alternatively, an interactive three-dimensional model of a product. While appealing, the resources required to produce this media often make this process prohibitively expensive for individual sellers or small retailers. Additionally, these interactive depictions are often an idealized computer-rendered 3D model of the product, rather than an image of the actual product the consumer will be purchasing.

Figure 1:
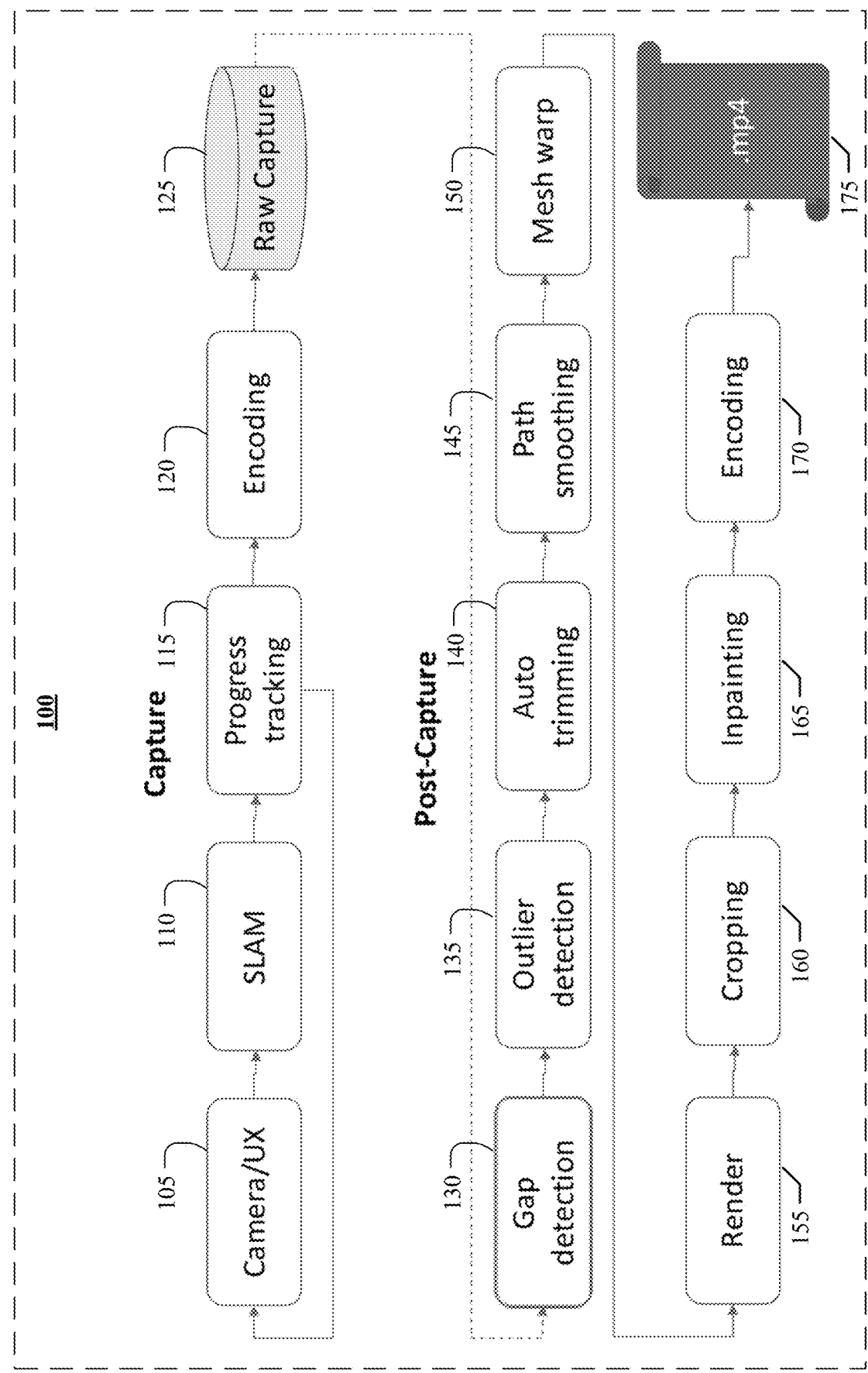
FIG. 1 illustrates an example process for capturing and outputting a sequence of warped images.

Particular embodiments described herein relate to capturing and outputting a sequence of warped images through common consumer equipment to improve an online seller's ability to provide professional-looking interactive media of their products to consumers in online marketplaces. FIG. 1 illustrates an example process 100 for capturing and outputting a sequence of warped images, which may involve one or more capture processes and one or more post capture processes for creating the sequence of warped images. Particular embodiments may repeat one or more of the steps depicted in FIG. 1, where appropriate. Although this disclosure describes and illustrates particular steps in FIG. 1 as occurring in a particular order, this disclosure contemplates any suitable steps of FIG. 1 occurring in any suitable order. Moreover, although this disclosure describes and illustrates an example process for outputting a sequence of warped images from a sequence of captured images including the particular processes of FIG. 1, this disclosure contemplates any suitable method for outputting a sequence of warped images from a sequence of captured images including any suitable steps, which may include all, some, or none of the steps of FIG. 1, where appropriate. Furthermore, although this disclosure describes and illustrates particular components, devices, or systems carrying out particular steps of FIG. 1, this disclosure contemplates any suitable combination of any suitable components, devices, or systems carrying out any suitable steps of FIG. 1.

Example process 100 may be conducted by a computing system comprising a camera and associated user interface 105 ("UX" or "GUI"). In particular embodiments, the computing system may be, for example, a mobile computing system—such as a smartphone, tablet computer, or laptop computer. This mobile computing system may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing systems may also execute software applications, such as games, web browsers, or social-networking applications. With social-networking applications, users may connect, communicate, and share information with other users in their social networks.

Example process 100 begins with a series of processes for capturing a sequence of images for outputting a sequence of warped images. Camera and associated user interface 105 captures a sequence of images of a subject, such as an object. In particular embodiments, capturing the sequence of images may comprise one or more methods of tracking the location and mapping the pose of camera and associated user interface 105 as it moves throughout a scene, for example and not by way of limitation, Simultaneous Localization and Mapping ("SLAM") Technology 110. SLAM 110 permits the computing system to map one or more camera positions associated user interface 105 when each image in the sequence of images is captured. In particular embodiments, capturing the sequence of images may also comprise a method for progress tracking 115. Progress tracking 115 may comprise, for example, one or more indicators on user interface 105 to inform a user of the appropriate movement direction of the camera while capturing the sequence of images. In particular embodiments, capturing the sequence of images may also comprise a method for encoding 120 the captured sequence of images. The end result of this series of processes is raw capture 125, which comprises a sequence of images and associated image data that may be used for outputting a sequence of warped images of the subject.

After obtaining raw capture 125 of the sequence of images, example process 100 may continue with one or more post-capture processes to render the sequence of warped images. In particular embodiments, the computing system may perform gap detection 130. Gap detection 130 may comprise identifying and adjusting the pose of one or more camera positions based on criteria detailed herein. In particular embodiments the computing system may conduct outlier detection 135 in order to identify and remove one or more outlier points within a three-dimensional point cloud created from the sequence of images as detailed herein. In particular embodiments the post capture process may also comprise auto-trimming 140 one or more images from the captured sequence of images. Auto trimming 140 may comprise removing one or more images from the sequence of images based on one or more criterion described herein.

In particular embodiments process 100 may also comprise path smoothing 145, as detailed herein, whereby the computing system renders a smooth view path based on the one or more camera positions. In particular embodiments, this view path may be generated using one or more control points that correspond to one or more camera positions described herein. In particular embodiments, this view path may be fit a predetermined shape (e.g. an arc or semicircle) or a mathematical equation (e.g., an $n^{th}$ degree polynomial equation). In particular embodiments, the computing system may further generate a focus path based on one or more focus points that represent a three-dimensional point in space that a virtual camera would focus towards as detailed herein.

In particular embodiments process 100 may also comprise mesh warping 150, which comprises the computing system warping an image in the sequence of images associated with a selected first camera position as detailed herein. By utilizing the first camera position, a position of second virtual camera located along the smooth virtual camera path, and the three-dimensional locations of object features depicted in the selected image, the computing system can adjust the image by warping a mesh such that image simulates a viewpoint of the second virtual camera located along the smooth virtual camera path. The computing system may repeat this process for each image in the captured sequence of images, resulting in a sequence of warped images.

In particular embodiments process 100 may also comprise rendering the sequence of warped images 155 and making one or more adjustments to the sequence of warped images through cropping 160 and inpainting 165 as detailed herein. In particular embodiments these adjustments are determined by identifying a scaling factor for each image in the outputted sequence of warped images, as each image is warped in a unique manner. This scaling factor may be determined by identifying a scaling factor required to satisfy a target resolution for each image of the sequence of warped images. Based on the scaling factor, cropping 160 and inpainting 165 may be conducted accordingly, as detailed herein.

After cropping and inpainting, the computing system may encode 170 the sequence of warped images to a particular file format. The end result of process 100 is an outputted file 175 comprising the outputted warped sequence of images of the subject. File 175 may comprise any format suitable for viewing, including for example, .mp4, .mov, .wmv, .flv, or .avi. In particular embodiments file 175 may be outputted for view on a user interface associated with a client device. This user interface may comprise one or more elements that permit a user to interact with the outputted sequence of warped images on file 175, including for example, rotating the subject of the warped images.

Figure 2:
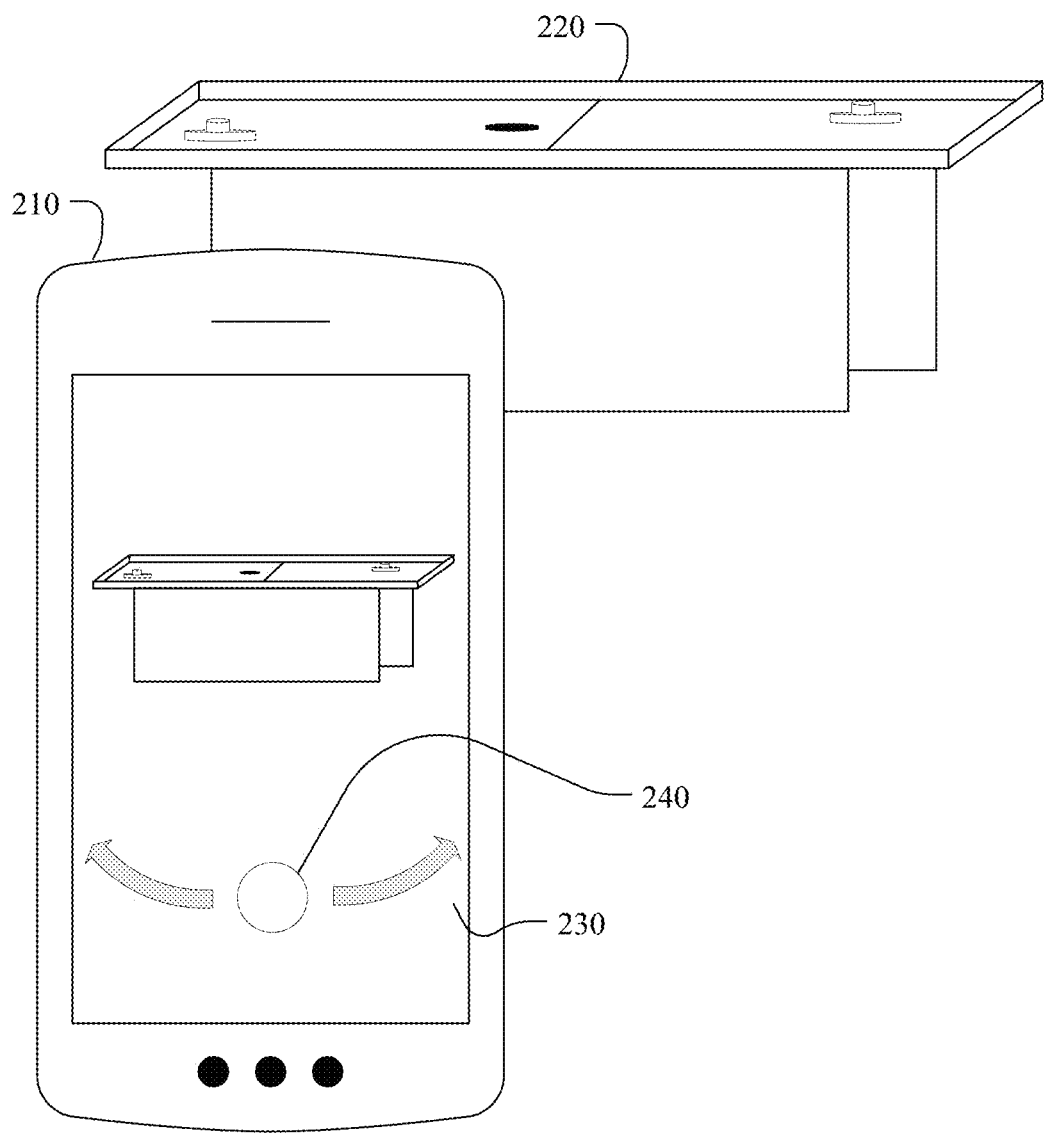
FIG. 2 illustrates an example wireframe of a GUI on a client device 110 for capturing a sequence of images of an object for use in outputting a sequence of warped images.

FIG. 2 illustrates an example wireframe of a GUI on a wireless device 210 for capturing a sequence of images of an object for use in outputting a sequence of warped images. For example, a seller may be interested in listing an object 220 (e.g., an air hockey table) on an online marketplace for resale. Using a mobile application running on wireless device 210, the user may capture a sequence of images of object 220 from one or more camera positions. In particular embodiments, the GUI of wireless device 210 may include one or more user instructions 230 to move the wireless device 210 in a curved path for capturing the sequence of images. These may include, for example, one or more indicators such as visual icons (e.g., arrows, an icon of a wireless device 210 moving in desired capture direction, or a similar directional indicator), haptic feedback, sounds, or similar notifications for providing instructions to the user of wireless device 210 for proper capture of the sequence of images. The GUI may further include video capture button 240 and one or more indicators or grid lines to help the user keep object 220 centered during the capture process. Although not shown, the GUI may also include options for traditional camera application functionality, for example camera flash, lens zoom, and switching between a front-facing and rear-facing camera on wireless device 210. Although not shown, the GUI may also include one or more textual indicators (e.g., "Move around object slowly") providing instructions to the user of the wireless device 210.

In particular embodiments, the computing system may track the progress of wireless device 210 while capturing the sequence of images. In particular embodiments, the GUI may also comprise one or more indicators or notifications to inform the user of the proper movement of wireless device 210 while based on this progress tracking while capturing the sequence of images. This may be especially useful for inexperienced users, who may be unfamiliar with the appropriate movements of wireless device 210 required to successfully capture the sequence of images for image warping.

Progress tracking may comprise the computing system, for example, attempting to generate an intermediate smooth view path while capturing the sequence of images, according to one or more methods for generating a smooth view path described herein. In particular embodiments, the computing system may attempt to generate the intermediate smooth view path after every $n^{th}$ collected image in the sequence of images. In particular embodiments, if the computing system is able to generate an intermediate view path according the methods herein, the computing system may compute and indicate that at least one image in the captured sequence of images has already been captured from a particular viewpoint via one or more indicators or notifications on the GUI.

Utilizing a traditional wireless device to capture image data provides many benefits over traditional methods utilized by retailers. Relative to expensive camera equipment and graphics and modeling software, wireless device 210 is relatively affordable, widely owned by sellers and consumers, and provides greater utility to a majority of sellers and consumers. To render a sequence of warped images, the user merely captures a sequence of images of an object 220, such as an air hockey table, from wireless device 210. The minimal expenditure in equipment and labor permits sellers to create an interactive sequence of warped images of products they offer for sale at low cost, effort, and time expense.

As another example, creating the sequence of warped images from the captured image data, rather than a modeled image, permits more accurate depictions of the object 220 available for sale. 3D models utilized by many retailers are merely depictions of the product, rather than an actual image captured of an object. While this may be acceptable to some buyers for purchases of new products, many buyers of used products would prefer to view the actual item they are purchasing, as it permits buyers to inspect the item for wear or damage prior to making a purchasing decision.

Figure 3A:
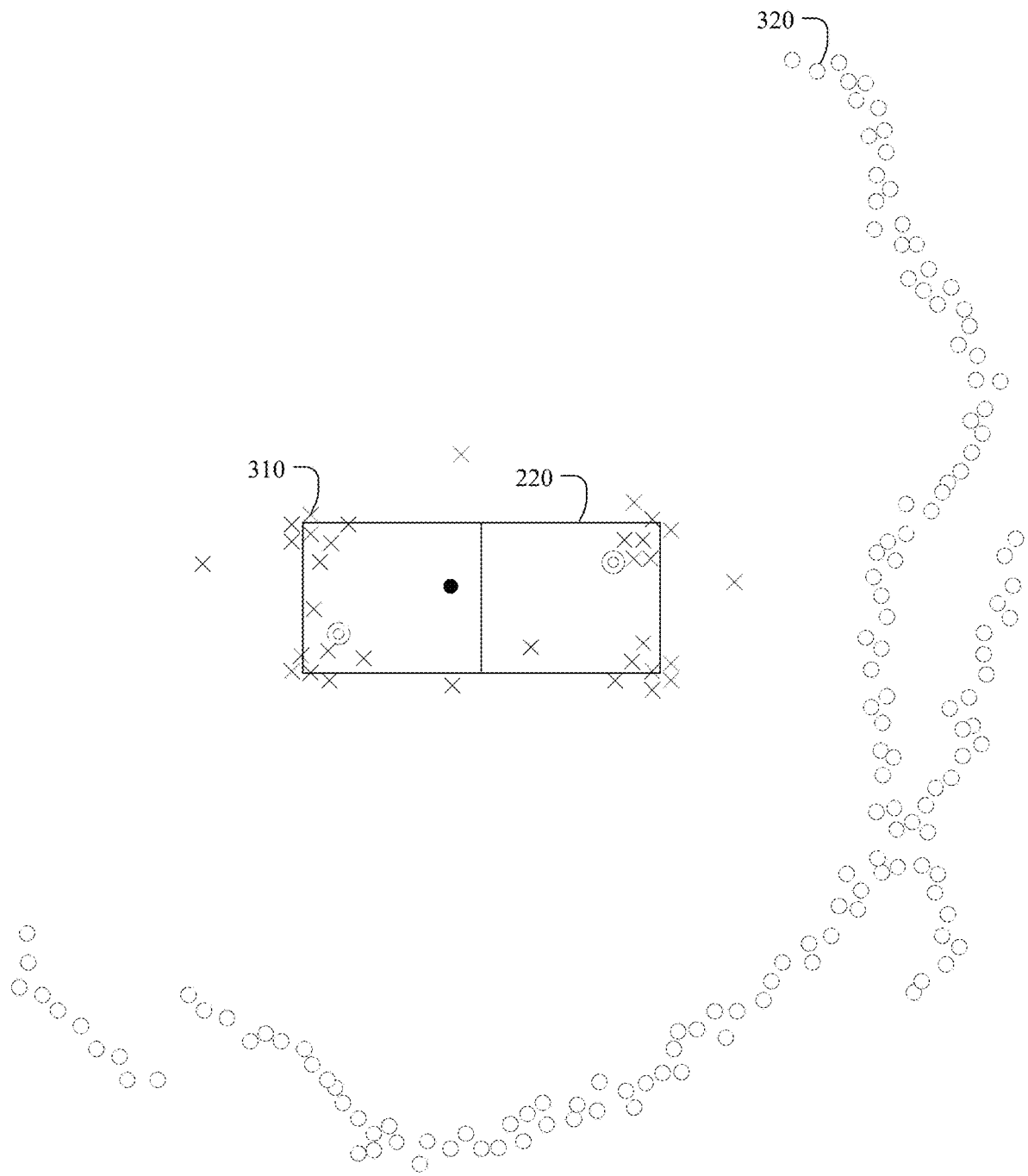
FIG. 3A illustrates an example spatial distribution of one or more camera positions corresponding to each image in a sequence of captured images of an object.

FIG. 3A illustrates an example spatial distribution of one or more camera positions 320 corresponding to each image in a sequence of captured images of an object 220 (depicted as an air hockey table). In this example, a spatial distribution of each camera position 320 corresponding to each image in the sequence of images is viewed from above object 220, e.g., on an x-y plane. For each image in the sequence of captured images of an object 220, the computing system may determine one or more three-dimensional locations 310 of object features depicted in the image and a camera position 320 of the camera of the wireless device 210 when the image is captured.

In particular embodiments the post capture process may also comprise auto-trimming 140 one or more images from the captured sequence of images. Auto trimming 140 may comprise removing one or more images from the captured sequence of images based on one or more criterion. As an example, one or more duplicate images be caused by a traveled path of a user moving wireless device 210 while capturing the sequence of images. For example, a user may retrace one or more portions of the path of the spatial distribution of camera positions to ensure sufficient images of object 210 are collected from one or more camera viewpoints 320. In this example, the computing system may determine multiple images are captured from an identical camera position 320, and select the best image from the multiple images while removing other duplicate images captured from the same camera position 320. As another example, one or more duplicate images be caused by the user maintaining wireless device 210 in a stationary position for a period of time. This often occurs at the beginning or end of the capture process. In this example, the computing system may determine multiple images are captured from an identical camera position 320, and select the best image from the multiple images while removing other duplicate images captured from the same camera position 320.

For each image in the sequence of images, the computing system may determine in particular embodiments a corresponding camera position 320 of the camera of wireless device 210 when the image is captured. The camera position 320 may comprise, for example and not by way of limitation, a pose, including the three-dimensional location (x, y, z, q, etc. coordinates) and orientation (e.g., whether wireless device 210 is facing towards object 220) of the camera located on wireless device 210 when the image in the sequence of images is captured. In particular embodiments this pose information for each camera position 320 may be determined, for example and not by way of limitation, by using an absolute real-world coordinate system, or relative to one or more other camera positions 320 or one or more objects 220 contained within a scene.

In particular embodiments, the camera position may be determined by one or more methods of tracking the location and mapping the pose of the wireless device 210 as it moves throughout a scene, for example and not by way of limitation, Simultaneous Localization and Mapping ("SLAM") Technology 110. These technologies may utilize data from wireless device 220 and data from one or more images in the sequence of images to determine a corresponding camera position 320 of the wireless device 210 when the image is captured.

In particular embodiments, the desired path of the spatial distribution of the one or more camera positions 320 corresponding to each image in a sequence of captured images of an object 220 may be based on user instructions 230 from the GUI on wireless device 210, and may include for example, an arc or semicircle around object 220. User instructions 230 to capture images may comprise capturing one or more images in the sequence of images from camera positions 320 that are spatially distributed on a particular shape or geometric path. In other embodiments, the spatial distribution of each camera position 320 may be determined by a user of wireless device 210 without guidance or user instructions 230 with regard to a particular shape or geometric path.

Figure 3B:
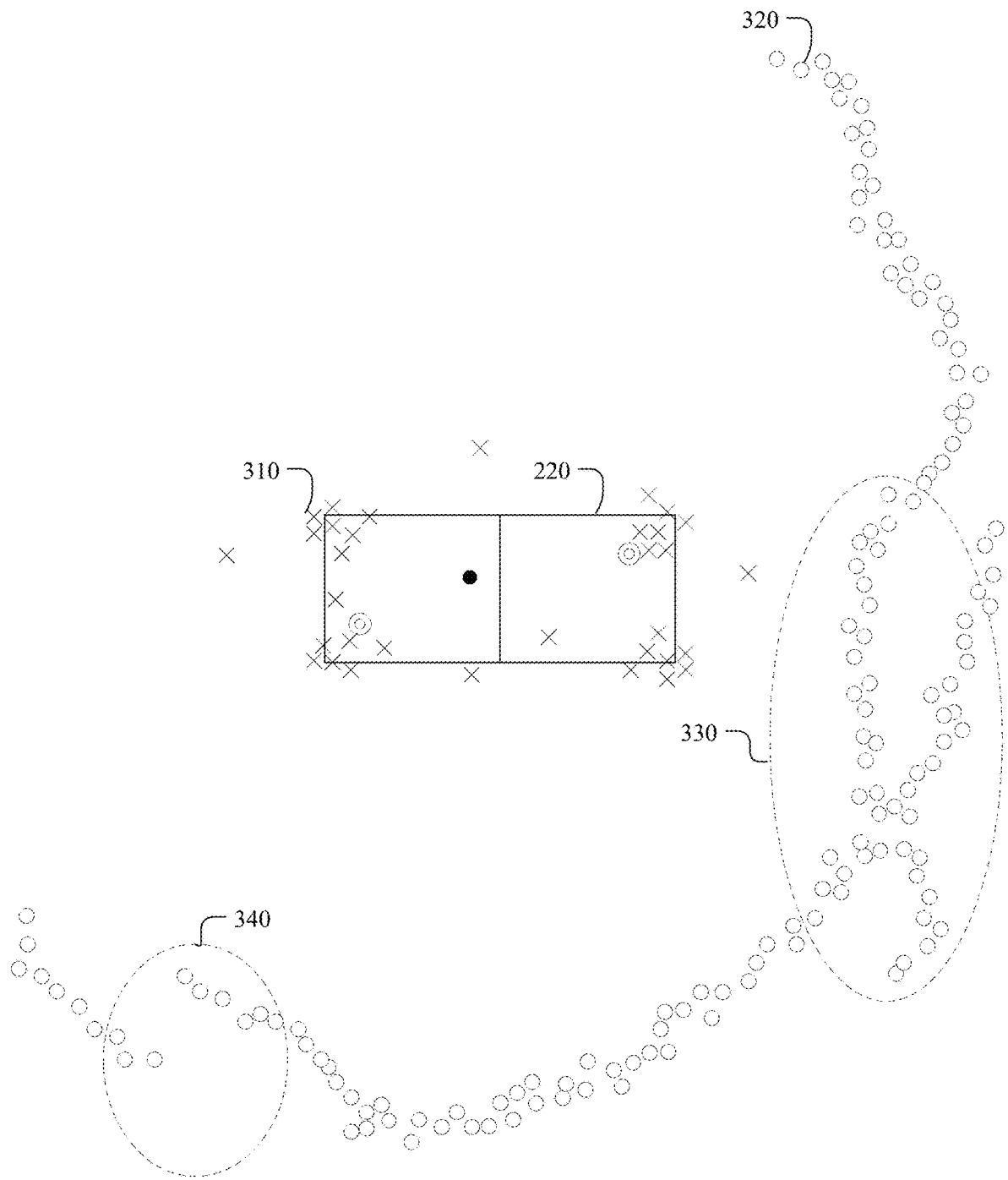
FIG. 3B illustrates examples of gaps in the spatial distribution of one or more camera positions.

In particular embodiments, the computing system may detect one or more gaps that may identify an irregularity between a first set of camera positions associated with a first continuous subset of the path of the spatial distribution of camera positions and a second set of camera positions associated with a second continuous subset. Gaps are problematic for outputting a sequence of warped images, as they may result in sudden changes in a point of view due to jumps between the first continuous subset of the path and a second continuous subset of the path. FIG. 3B illustrates examples of gaps in the spatial distribution of one or more camera positions 320. An overlapping gap 330 may occur due to spatial overlap or the crossing of one or more continuous subsets of the path of the spatial distribution camera positions. In another example, a parallel gap 340 may occur when a first and second continuous subset of the path of the spatial distribution of camera positions never intersect, or when a first continuous subset of the path of the spatial distribution of camera positions deviates a minimum distance from a second continuous subset of the path of the spatial distribution of camera positions. In particular embodiments, the computing system may identify one or more gaps by determining a distance between camera viewpoints exceeds a minimum distance. In particular embodiments this minimum distance may be an absolute distance (e.g. any distance exceeding 6 inches), or it may be a relative distance (e.g., any distance that is two times larger than an average distance between each of the camera positions 320).

One or more gaps may be caused by the traveled path of a user moving wireless device 220 while capturing the sequence of images. For example, a user may attempt to retrace one or more portions of the path of the spatial distribution of camera positions to ensure sufficient images of object 220 are collected from one or more camera viewpoints 320. However, the user may inadvertently traverse a second traveled path that is slightly different that the first path of the spatial distribution of camera positions, resulting in a spatial distribution of camera positions 320 that comprise one or more overlapping gaps 330.

As another example, one or more gaps may be caused by limitations in location and mapping technologies such as relocalization resulting from SLAM. These limitations may lead to one or more pose inaccuracies in one or more camera positions 320. The effect of these one or more pose inaccuracies is a spatial distribution where wireless device 210 suddenly "jumps" from one three-dimensional location to another three-dimensional location. This may result in a spatial distribution of camera positions 320 that comprise one or more parallel gaps 340.

Figure 3C:
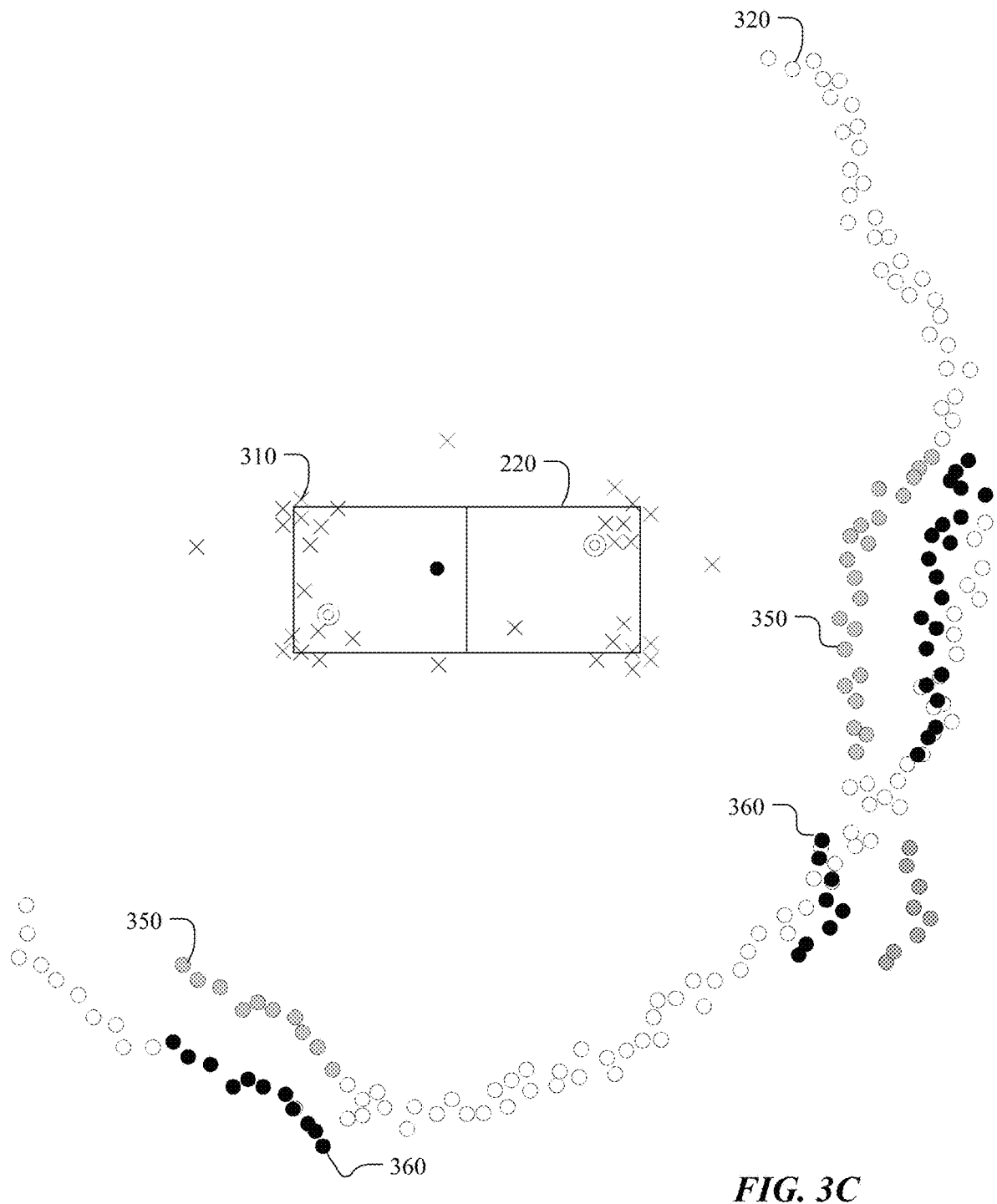
FIG. 3C illustrates examples of the computing system adjusting the pose of one or more camera positions to close one or more gaps.
Figure 3D:
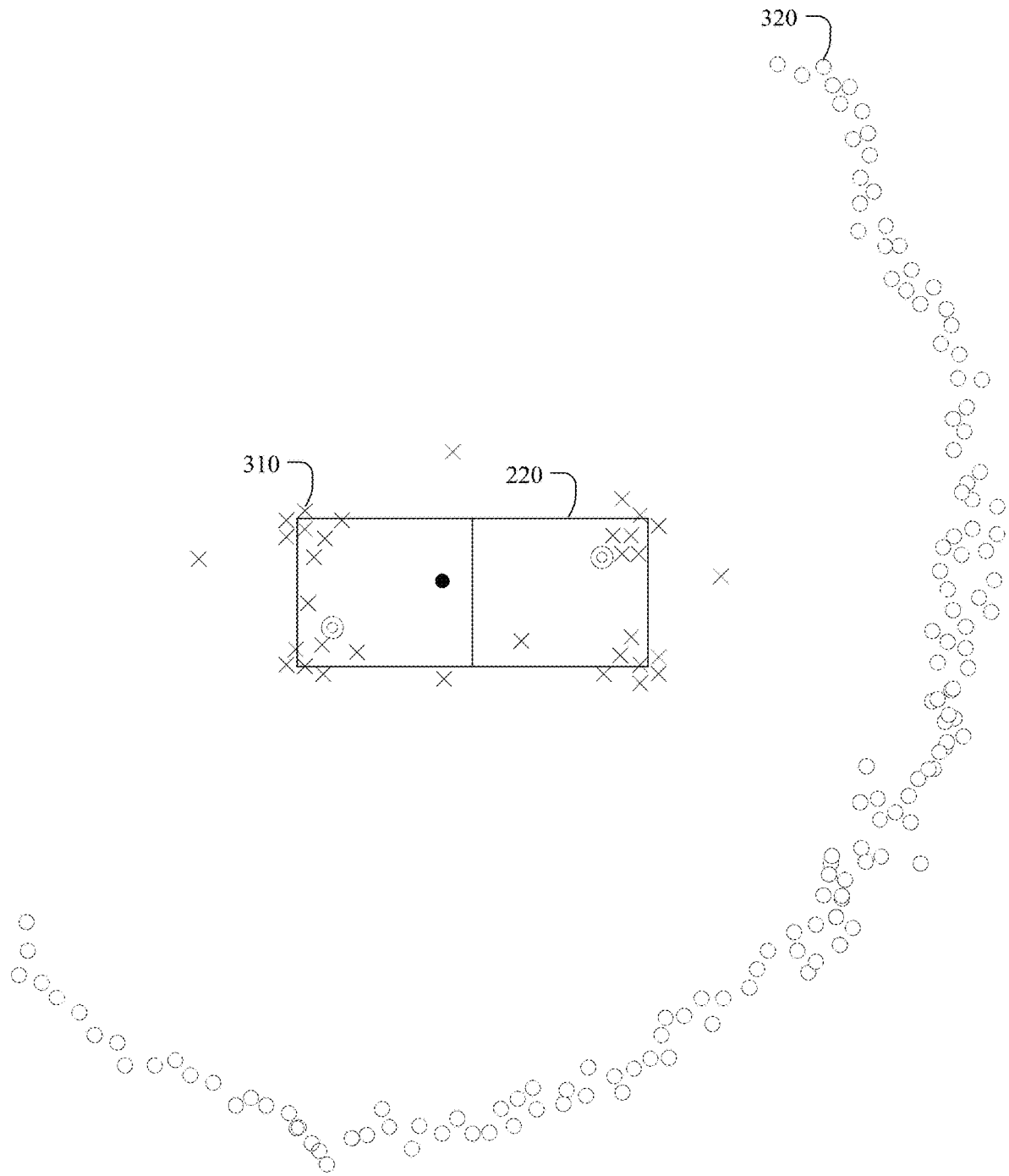
FIG. 3D illustrates an adjusted spatial distribution of camera positions after adjusting for one or more gaps.

In some examples, the computing system may adjust the pose of one or more camera positions 320 associated with a continuous subset of the sequence of images to close the gap. FIG. 3C illustrates examples of the computing system adjusting the pose of one or more camera positions 320 to close one or more gaps. For example, the computing system may identify one or more continuous subsets of the path of the spatial distribution of camera positions that comprise part of a gap as described herein. The computing system may adjust the pose of one or more camera positions 320 such that one or more poses of the camera positions comprising the continuous subset are moved from original camera position 350 to gap adjusted camera position 360. In particular embodiments, these gaps may be adjusted such that the spatial distribution of camera positions conform to a particular shape or geometric path, and so the orientation between camera viewpoints is consistent. FIG. 3D illustrates an adjusted spatial distribution of camera positions 320 after adjusting for one or more gaps. The end result is a continuous or nearly continuous spatial distribution of one or more camera positions 320 identified by the computing system.

Figure 4:
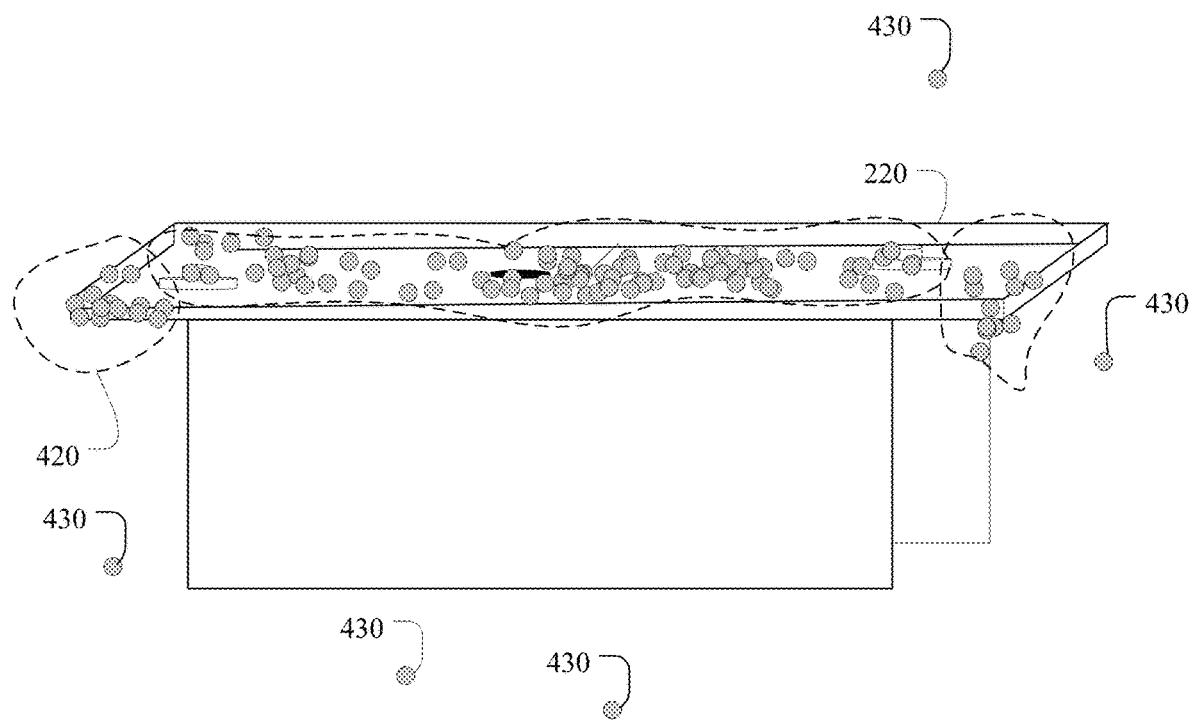
FIG. 4 illustrates a point cloud and grouping one or more points representing three-dimensional locations of object features into one or more clusters in an example image of a captured sequence of images.

In particular embodiments, the computing system may generate a point cloud from one or more images of the captured sequence of images. FIG. 4 illustrates a point cloud and grouping one or more points representing three-dimensional locations 310 of object features into one or more clusters 420 in an example image 400 of a sequence of images. Using SLAM or a similar technology, this point cloud may include, for example, the three-dimensional locations 310 of one or more object features contained within the image 400, such as a corner or particular surface of object 220 contained within image 400. Due to inaccuracies with SLAM or a similar technology, one or more points representing three-dimensional locations 310 may be inaccurately positioned within the point cloud. The computing system may be particularly impacted by these inaccuracies if they are shallow (e.g., located at an image depth that is too close to the camera position 320) as they can occlude the scene and prevent proper image warping.

To enable proper image warping, the computing system may identify and remove one or more outlier points 430 representing one or more three-dimensional locations 310 of object features that are inaccurate. In particular embodiments the computing system may filter the point cloud by grouping and creating clusters 420 of one or more three-dimensional locations 310 of object features depicted in the sequence of images. These clusters may be generated utilizing any density-based clustering technique, for example a DBSCAN algorithm. In particular embodiments these clusters may correspond to, for example, or more features of object 220, such as a corner of a table or particular surface.

In particular embodiments, the computing system may determine one or more outlier points 430 that are not positioned within one or more clusters 420. In particular embodiments the one or more outlier points 430 may exceed a threshold distance from the one or more clusters 420. In particular embodiments the one or more outlier points 430 may fail to exceed a minimum threshold distance from the camera position 320 (e.g. are too shallow). The computing system may identify and subsequently remove one or more outlier points 430 from the point cloud.

In particular embodiments, the computing system may determine a plurality of control points 510 based on the camera positions 320 associated with the sequence of images. In particular embodiments, the control points 510 may comprise one or more camera positions 320 associated with a continuous subset of the sequence of images. In particular embodiments, the control points 510 may comprise one or more adjusted camera positions 360 associated with a continuous subset of the sequence of images resulting from one or more gap adjustments. The computing system may identify any number of control points required to accurately represent the continuous or nearly continuous spatial distribution of camera positions.

Figure 5:
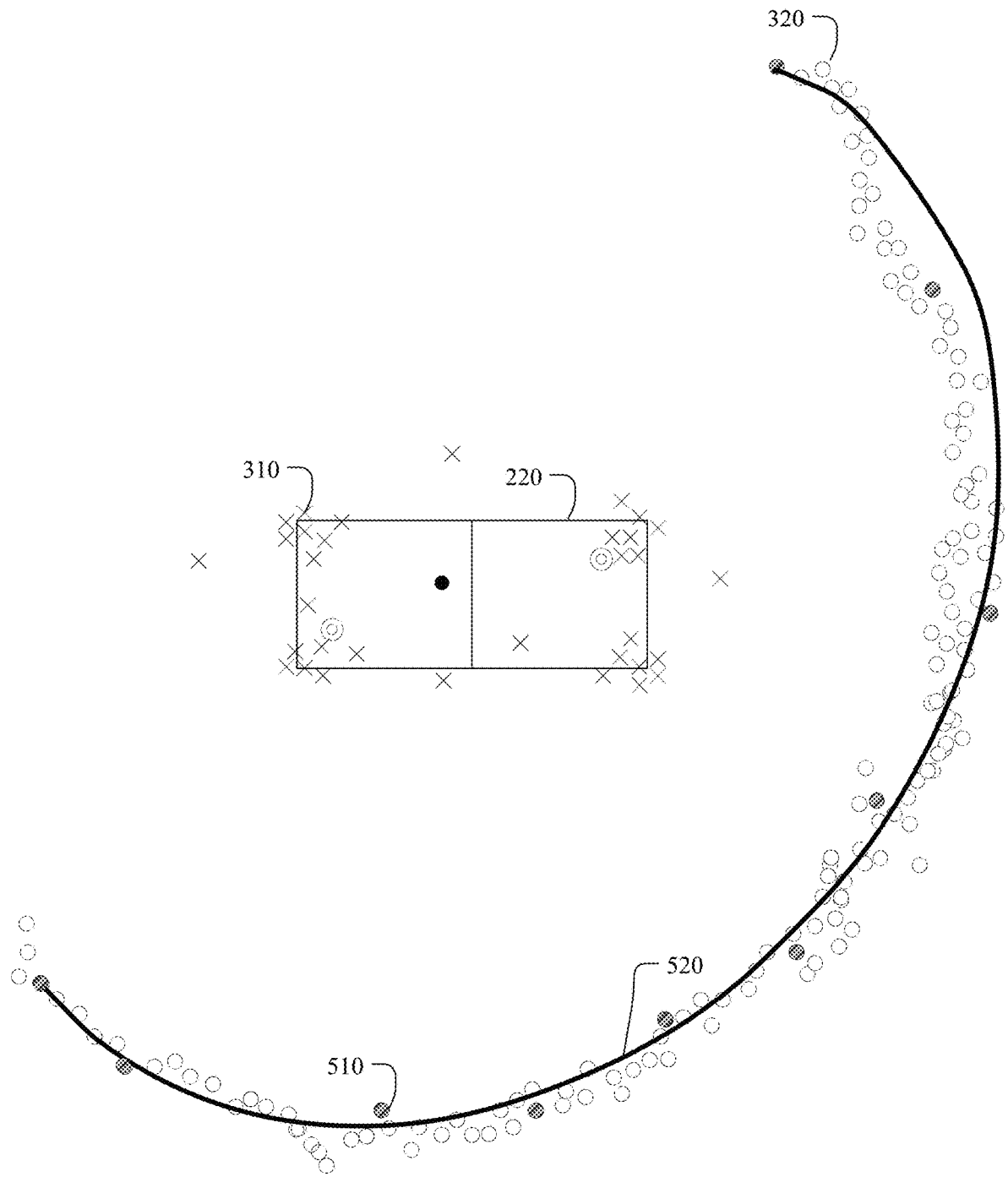
FIG. 5 illustrates utilizing one or more control points to formulate a view path.

Using one or more control points 510 the computing system will determine a view path 520 for the virtual camera based on the camera positions 320 and adjusted cameras positions 360 associated with the sequence of images. FIG. 5 illustrates utilizing one or more control points 510 to formulate a view path 520 for a virtual camera. In particular embodiments, determining the view path 520 for the virtual camera comprises generating a spline using the plurality of control points 510. In particular embodiments, the control points define a frame, similar to a boundary, with which view path 520 must traverse between. In particular embodiments, view path 520 may optionally intersect with one or more control points 510 or one or more camera positions 320.

In particular embodiments, view path 520 may represent the perspective of a virtual camera viewing the object 220, for example, from a perspective that is similar but different from any of the camera positions 320. In particular embodiments, view path 520 is defined by a smooth spline, at least a portion of which may be fit according to one or more geometric shapes, for example and not by way of limitation, an arc or semicircle. In particular embodiments, at least a portion of view path 520 may be fit according to one or more mathematical equations, for example and not by way of limitation, an $n^{th}$ degree polynomial equation. This results in a view path 520 that is smooth, providing spatial stability and avoiding sudden, jarring movements as the location of the virtual camera moves throughout a scene. View path 520 permits the computing system to render a sequence of warped images that is temporally stabilized and spatially smooth as the rendered view rotates around object 220.

Figure 6:
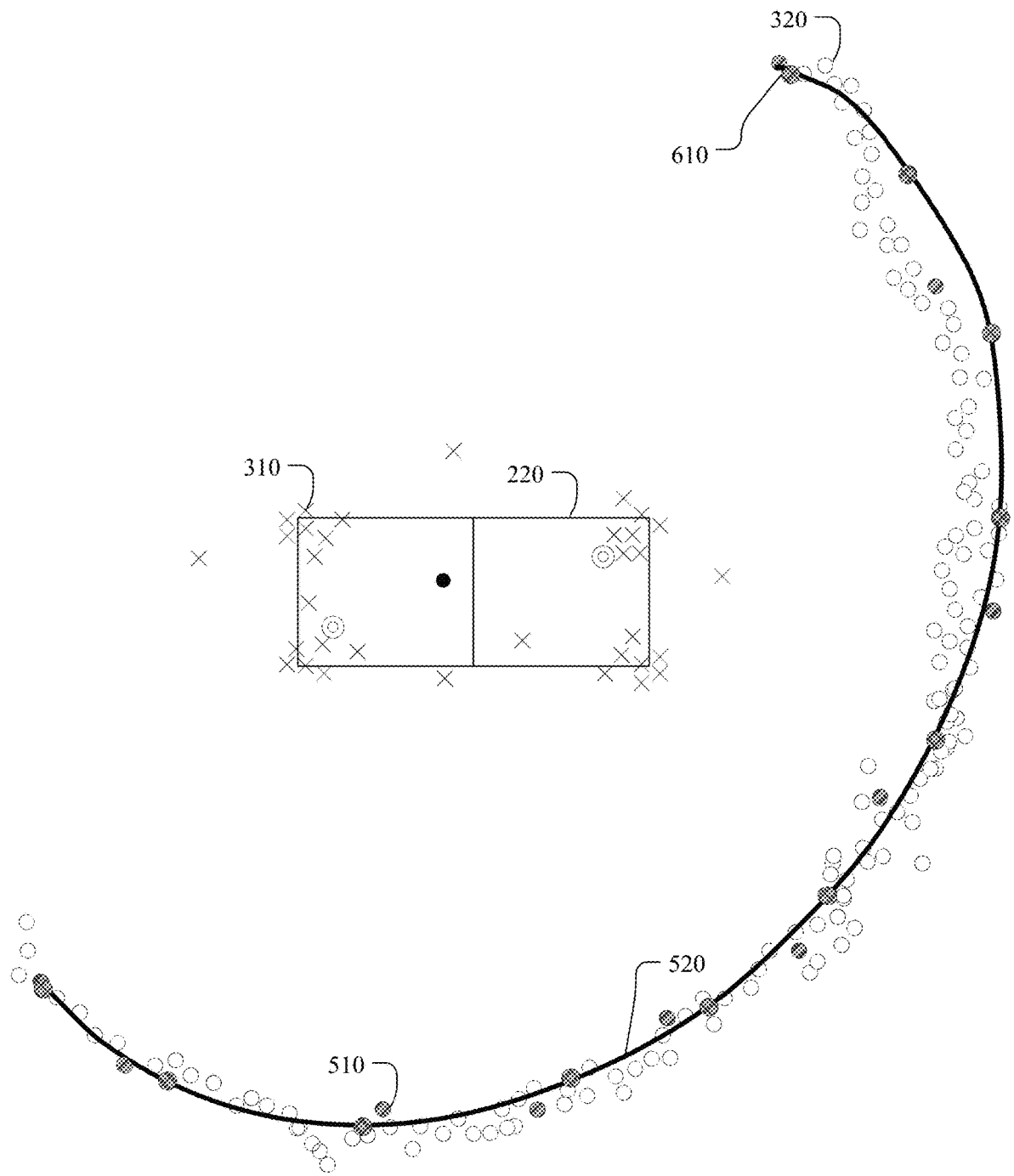
FIG. 6 illustrates generating one or more camera positions of the virtual camera along view path.

View path 520 can be utilized to determine one or more virtual camera positions 610. FIG. 6 illustrates generating one or more of the virtual camera positions 610 for the virtual camera along view path 520. The virtual camera positions 610 may comprise a pose, comprising a three-dimensional location and orientation of the virtual camera. In particular embodiments one or more virtual camera positions 610 may intersect with one or more camera positions 320 located along the view path 520. In particular embodiments, the one or more virtual camera positions 610 may be separated by a predetermined interval along the view path 520, providing for temporal stabilization. By interpolating at a regular predetermined interval, the computing system can normalize the speed of the outputted sequence of warped images, providing smooth transitions between each warped image in the sequence of warped images. These virtual camera positions 610 represent locations along the view path 520 where the computing system generates one or more warped images that are utilized to generate the outputted sequence of warped images.

Figure 7A:
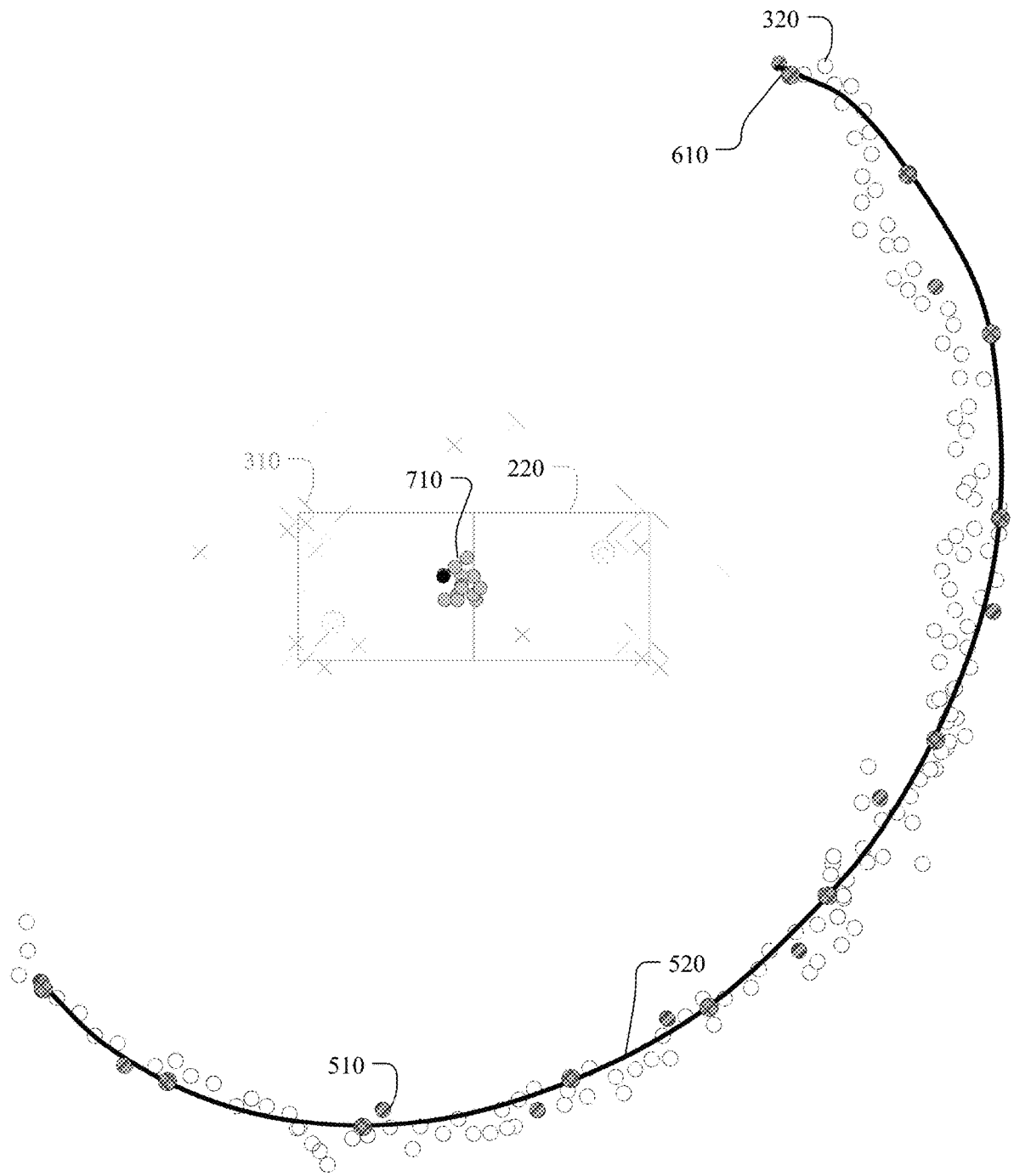
FIG. 7A illustrates a set of focus points for each of the virtual camera positions optimized for both smoothness of a path corresponding to the focus points and compactness.

In particular embodiments the computing system may generate a corresponding focus point 710 for each of the one or more virtual camera positions 610. FIG. 7A illustrates a set of focus points for each of the virtual camera positions optimized for both smoothness of a focus path 720 corresponding to the focus points and compactness of the focus path 720. For each of the one or more virtual camera positions 610, the computing system may identify a corresponding focus point 710 that represents a three-dimensional point in space that a virtual camera located at a corresponding virtual camera position 610 would focus towards (e.g., a virtual camera at virtual camera position 610 would position itself such that an image captured from a virtual camera at virtual camera position 610 would have corresponding focus point 710 captured in the center of the image). In particular embodiments, the computing system may generate a focus path 720 corresponding to each of the focus points 710.

In particular embodiments, the corresponding focus points 710 for each virtual camera position 610 are determined based in part on optimizing a smoothness of the focus path 720 corresponding to the focus points 710. In particular embodiments, the computing system attempts to identify a focus path 720 corresponding to the focus points 710 that may be fit for smoothness, for example, according to one or more geometric shapes (e.g., an arc or semicircle), or according to one or more mathematical equations (e.g., an $n^{th}$ degree polynomial equation). In particular embodiments, this focus path 720 may attempt to form a consistent geometry to view path 520. This results in a focus path 720 corresponding to the focus points 710 that is smooth, providing spatial stability and avoiding sudden, jarring movements in the focus point as the virtual camera moves throughout a scene around object 220.

In particular embodiments, the corresponding focus points 710 for each virtual camera position 610 are further determined based in part on optimizing a compactness of the focus path 720. FIG. 7A illustrates a set of focus points 710 that are optimized based in part on optimizing a compactness of the focus path 720. Although not depicted due to its compactness, the focus points 710 in FIG. 7A may include a focus path 720 connecting the corresponding focus points 710. As part of the optimizing for compactness, the computing system seeks to identify corresponding focus points 710 that keep this focus path 720 as short as possible while maintaining smoothness of the focus path 720. This optimization is especially useful for capturing a sequence of images for small objects, where a user of wireless device 210 is easily able to keep each image in the sequence of images focused on a central position of an object while moving wireless device 210 in a circular path while maintaining a consistent distance from object 220.

In particular embodiments, the computing system may be unable to optimize corresponding focus path 720 based on compactness. This is due, for example, to a compact focus path 720 being too close in space to (or in some examples, interweaving with) view path 520, resulting in unstable virtual camera orientations (e.g., one or more virtual viewpoints 610 where the virtual camera may orient away from object 220). In these embodiments, the corresponding focus points 710 for each virtual camera position 610 are determined based in part on optimizing both smoothness of the focus path 720 corresponding to the focus points 710 and optimizing a distance between each of the virtual camera positions 610 and their respective focus points 710 to be close to a predetermined target distance.

Figure 7B:
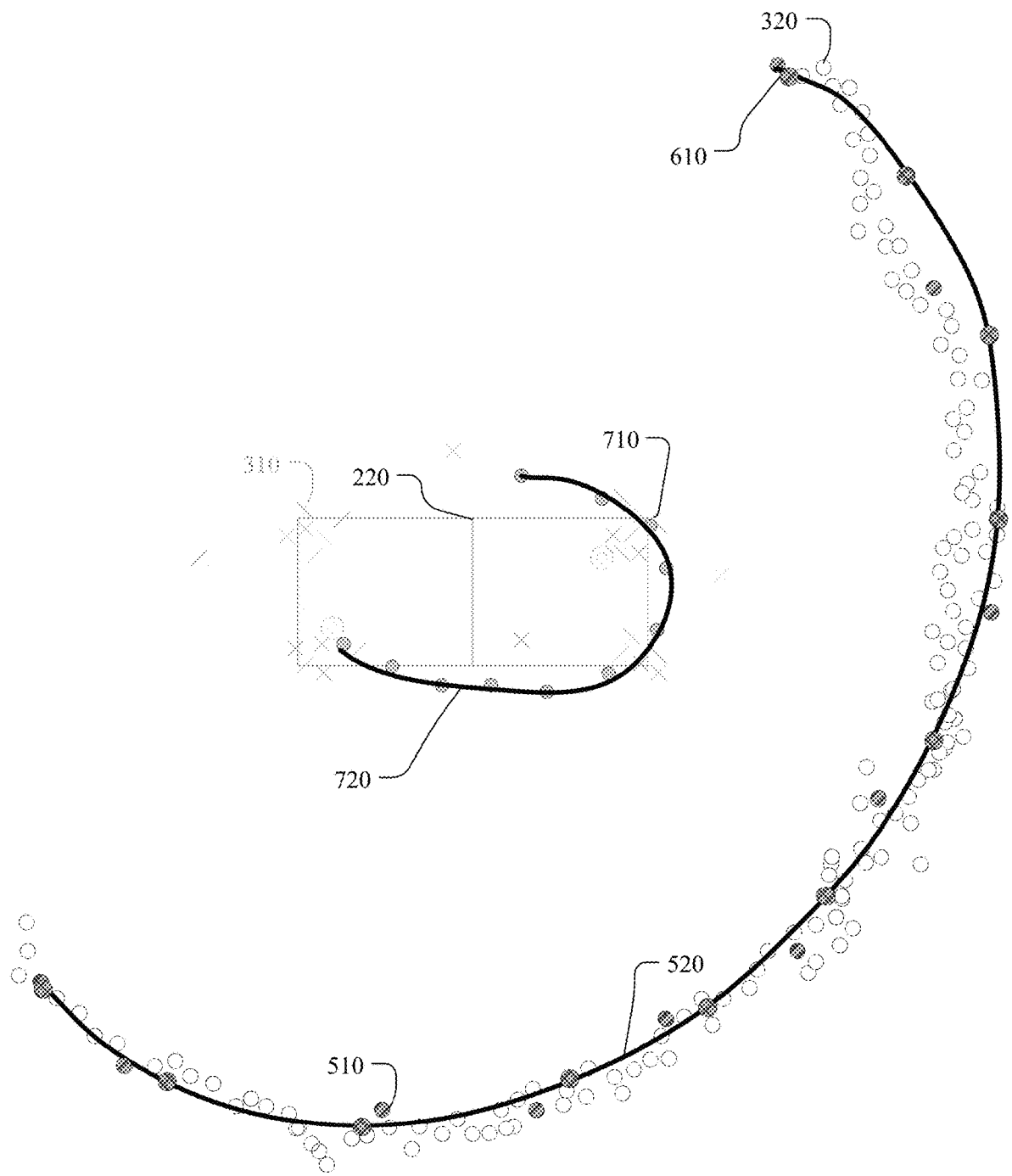
FIG. 7B illustrates a set of focus points for each of the virtual camera positions optimized for both smoothness of a path corresponding to the focus points and distances between the virtual camera positions and their respective focus points to be close to a predetermined target distance.

FIG. 7B illustrates a set of focus points 710 for each of the virtual camera positions 610 optimized for both smoothness of a focus path 720 corresponding to the focus points 710 and distances between the virtual camera positions 610 and their corresponding focus points 710 to be close to a predetermined target distance. This optimization does not consider compactness when determining one or more focus points 710 (e.g., seeking to minimize the length of the path corresponding to the focus points 710). By optimizing for a predetermined target distance (e.g., 1 meter) between view path 520 and of the focus path 720, the computing system may eliminate occurrences of interweaving between view path 520 and focus path 720. This is especially useful for capturing a sequence of images of large objects where it is difficult for a user of wireless device 210 to keep the camera on wireless device 210 focused on a central position of an object 220. This optimization is also useful for capturing a sequence of images of objects in a confined real space, where it is difficult for a user of wireless device 210 to keep wireless device 210 at a consistent distance from the object as wireless device 210 captures the sequence of images. This optimization is also useful for inexperienced users, who may have trouble moving the wireless device 210 in a circular path around object 220.

Figure 8:
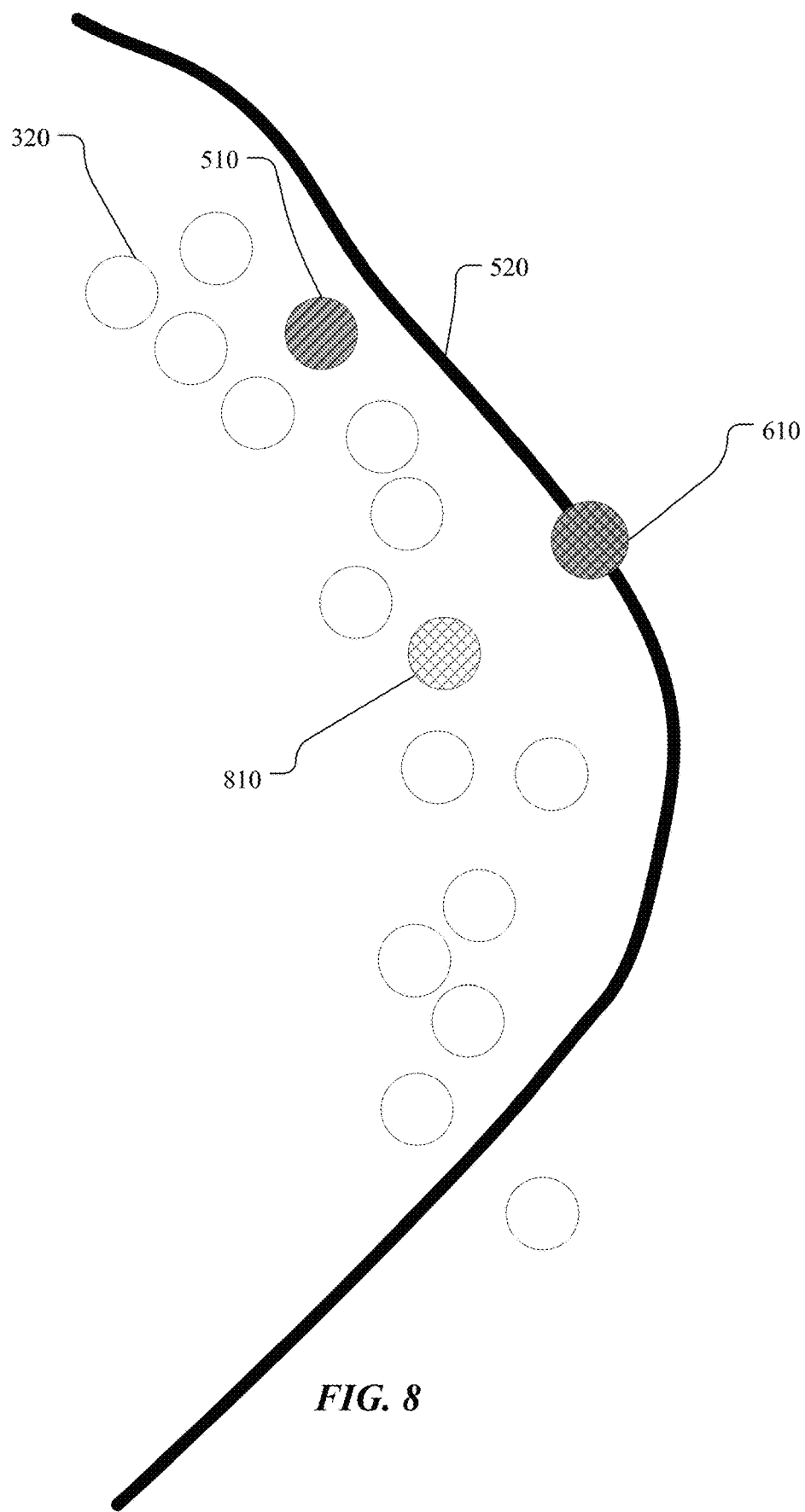
FIG. 8 represents an enlarged view of a virtual camera positions located on view path.

The computing system will subsequently generate a warped image for each virtual camera position 610, utilizing a process such as mesh warping. Each warped image replicates an image captured from virtual camera position 610 centered on corresponding focus point 710. In particular embodiments this will result in warping one or more areas of the image without affecting one or more other areas of the image. For each virtual camera position 610 the computing system selects a camera position associated with the sequence of images as a corresponding reference camera position 810. FIG. 8 illustrates an enlarged view of a virtual camera positions 610 located on view path 520 with corresponding reference camera position 810. In particular embodiments, reference camera position 810 is one of the camera positions 320 associated with the sequence of images. In particular embodiments the reference camera position 810 is selected by identifying a camera position 320 that is nearest to virtual camera position 610 (e.g., located at a minimum physical distance from virtual camera position 610). For each reference camera position 810 the computing system will identify an image that was captured at reference camera position 810. In particular embodiments reference camera position 810 may correspond to one or more virtual camera positions 610.

Mesh warping is conducted by utilizing the image associated with the selected reference camera position, reference camera position 810, the corresponding virtual camera position 610, and the three-dimensional locations 310 of object features depicted in the image associated with the selected reference camera position. FIG. 9A illustrates an example of projecting a three-dimensional location of one or more object features of an image onto a two-dimensional frame with a mesh. In particular embodiments, mesh warping comprises using the point cloud to generate a mesh 910, corresponding to the image associated with the selected reference camera position 810. In particular embodiments this mesh 910 may include for example, lines and corresponding mesh nodes 920.

The computing system may next project, based on at least the reference camera position 810, the three-dimensional locations 310 of one or more object features depicted in the image (represented as $x_i$) onto a two-dimensional frame, which may be divided into a grid by a mesh. In particular embodiments the one more three-dimensional locations of one or more object features used for the warping are each determined to be within a threshold distance of one of the one or more clusters 420. The two-dimensional reference feature points 930 (represented as $p_i$) are determined by the formula $p_i=C\ x_i$, where C represents reference camera position 810. The one or more two-dimensional reference feature points 930 can then be projected onto the frame with mesh 910.

The computing system may next project, based on at least the virtual camera position 610, the three-dimensional locations of one or more object features depicted in the image (represented as $x_i'$) onto a two-dimensional frame, which may be divided into a grid by a mesh. In particular embodiments the one more three-dimensional locations of one or more object features used for the warping are each determined to be within a threshold distance of one of the one or more clusters 420. The projected virtual feature points 940 (represented as $p_i'$) are determined by the formula $p_i'=C'\ x_i'$, where C' represents virtual camera position 610. One or more two-dimensional projected virtual feature points 940 can then be projected onto the frame with mesh 910.

Figure 10:
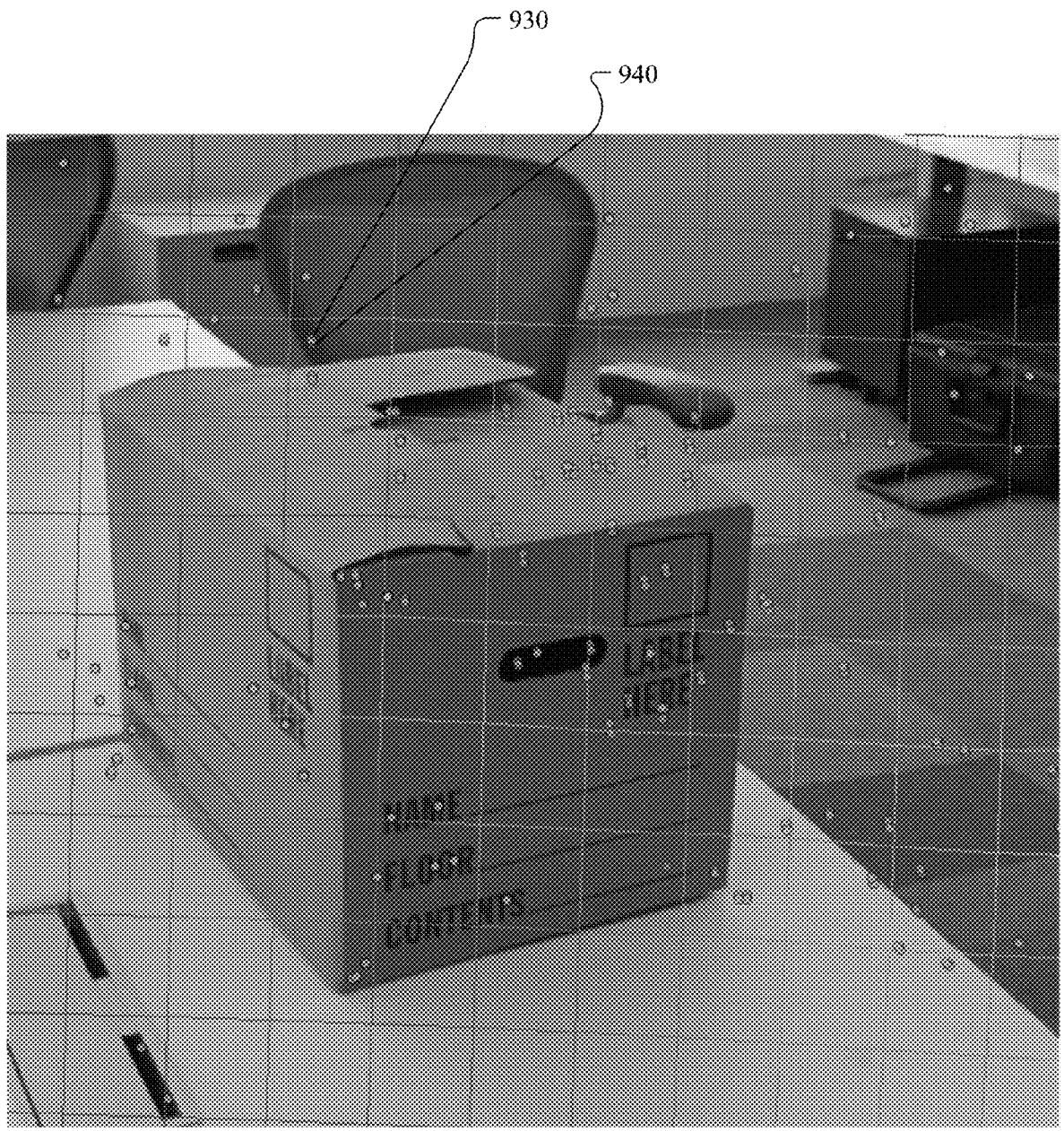
FIG. 10 illustrates projecting one or more sets of three-dimensional locations of object features onto the mesh based on the reference camera position and the virtual camera position.

In particular embodiments the computing system may generate a warped mesh based on the image associated with selected reference camera position 810, the two-dimensional reference feature points 930, and the two-dimensional projected virtual feature points 940. FIG. 10 illustrates projecting one or more sets of three-dimensional locations of object features onto the mesh based on the reference camera position 810 and the virtual camera position 610. A spatial relationship exists between each two-dimensional reference feature point 930 (depicted in pink) and the nodes of the mesh grid 920 on which it is located. In particular embodiments mesh warping may be conducted by assigning each node within the mesh a weighted factor (represented by $w_i$) based on this spatial relationship. In this example, the location of each two-dimensional reference feature point 930 (depicted in pink) can be represented by the formula $p_i=\Sigma\ w_i\ g_i$, and the formula for each two-dimensional projected virtual feature point 940 (depicted in purple) can be represented by the formula $p_i'=\Sigma\ w_i\ g_i'$. Utilizing this spatial relationship, the computing system can warp the mesh so that the two-dimensional reference feature point 930 (depicted in pink) of reference camera position 810 match the two-dimensional projected virtual feature points 940 (depicted in purple) of virtual camera position 610.

In particular embodiments, the system can then warp each image corresponding to reference camera position 810 so that it simulates an image captured from virtual camera position 610. FIG. 9B illustrates warping a mesh so that the two-dimensional reference feature points 930 of reference camera position 810 match the two-dimensional projected virtual feature points 940 of virtual camera position 610. In particular embodiments, this may result in multiple output frames from a single input frame may be warped in different ways. In particular embodiments warping the image associated with the selected reference camera position 810 for the corresponding virtual camera position 610 further uses the focus point 710 corresponding to the virtual camera position 610.

In particular embodiments the computing system may repeat one or more of these steps for each virtual camera position 610 located along the view path 520, resulting in a sequence of warped images associated with each virtual viewpoint 710 located on view path 520. In particular embodiments the frames per second of the outputted sequence of warped images may differ from the frames per second of the sequence of captured images.

In particular embodiments the computing system may adjust the sequence of warped images to further generate a smooth virtual camera path that increases the production value and appeal to a user, for example by scaling, cropping, or inpainting one or more of the warped images. In particular embodiments these one or more adjustments are determined by identifying a scaling factor for each image in the outputted sequence of warped images, as each image is warped in a unique manner, and determining the worst (e.g., largest) scaling factor for the sequence of warped images. This factor may be determined by identifying a minimum scaling factor required to satisfy a target resolution for each image of the sequence of warped images.

In particular embodiments, the worst scaling factor is determined to be below a predetermined minimum threshold. In this example, the computing system may scale the sequence of warped images according the scaling factors for each image in the outputted sequence of warped images. The computing system may also crop one or more of the scaled images in the warped images. This results in a sequence of warped images that meets a predetermined target resolution and a smooth virtual camera path.

In particular embodiments, the worst scaling factor is determined to be within a predetermine acceptable range (e.g. equal to or between a predetermined minimum threshold and a failing threshold). In this example, the computing system may scale the sequence of warped images according the scaling factors for each image in the outputted sequence of warped images. In particular embodiments, the computing system may lock the scaling factor at the minimum threshold for scaling. In particular embodiments, after scaling the sequence of warped images, the computing system may identify missing pixel information on one or more scaled images of the sequence of warped images that may resulting from large scaling factors. For example, scaling an image may result in missing pixel information on the outer border of the image. To remedy this missing pixel information, the computing system may subsequently in-paint one or more of the missing pixel information on one or more of the scaled images. In-painting may be conducted by any conventional methods, for example a Criminisi algorithm.

In particular embodiments, if the scaling factor exceeds a predetermined failing threshold, the computing system may fail to render an outputted sequence of warped images. In this example, the computing system may provide an error message via the GUI of wireless device 210, indicating the captured sequence of images was unsuccessful and prompting a user to attempt the capture again.

In particular embodiments the computing system may encode the sequence of warped images to a particular file format prior to output. The sequence of warped images may be encoded and outputted in a file comprising any format suitable for viewing, including for example, .mp4, .mov, .wmv, .flv, or .avi. In particular embodiments a file comprising the sequence of warped images may be outputted for view on a user interface associated with a client device.

Figure 11:
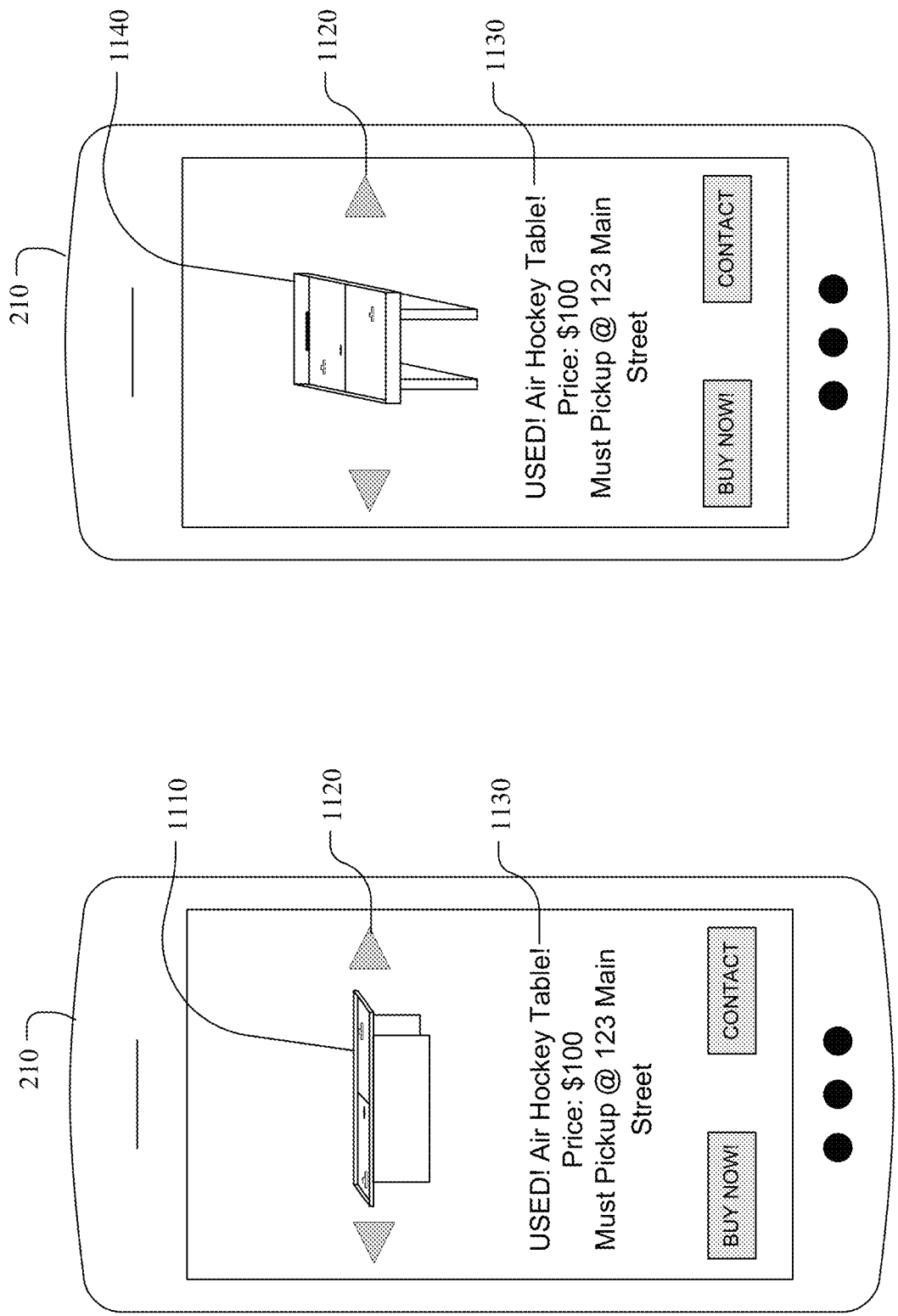
FIG. 11A illustrates an example wireframe of a GUI on a wireless device for viewing and interacting with the outputted sequence of warped images.
FIG. 11B illustrates an example wireframe of a GUI on a wireless device with an altered outputted sequence of the warped images via an interaction from a user with a GUI of wireless device.

In particular embodiments the sequence of warped images may be accessible to one or more users of an online platform, for example, the website of an online retailer or on a social networking system, via a user interface on a wireless device 120. FIG. 11A illustrates an example wireframe of a GUI on a wireless device 120 for viewing and interacting with the outputted sequence of warped images. Utilizing a wireless device 120, a user may view the outputted sequence of the warped images via a GUI. In particular embodiments the GUI of wireless device 120 may be associated with, for example and not by way of limitation, an online marketplace or a social networking system. In particular embodiments the GUI of wireless device 120 may include the outputted sequence of warped images 1110, one or more elements 1120 that permit a user of client device to interact with the outputted sequence of warped images 1110, for example and not by way of limitation, arrows. In particular embodiments these interactions may include, for example and not by way of limitation, rotating or zooming in on the outputted sequence of warped images 1110. In particular embodiments the GUI of wireless device 120 may further include one or more descriptions 1130 of the object 220 depicted in the outputted sequence of warped images 1110 that may be useful in an online shopping environment, such as a name, price, and method of delivery for the object 220 after purchase. Although not depicted, descriptions 1130 may further include, for example and not by way of limitation, information about the seller (e.g., contact information or a rating), the dimensions or weight of object 220, or the condition of the object 220 (e.g., used or new). FIG. 11B illustrates an example wireframe of a GUI on a wireless device 120 with an altered outputted sequence of the warped images 1140 via an interaction from a user with a GUI of wireless device 120. In this example, the altered outputted sequence of the warped images 1140 has been rotated via an interaction with a user of the wireless device 120. As previously noted herein, these interactions can include, for example and not by way of limitation, rotating or zooming in on the outputted sequence of warped images.

In particular embodiments, the user interface of wireless device 120 may comprising one or more visual effects when interacting with the outputted sequence of warped images 1110, for example and not by way of limitation scroll bouncing (e.g., the outputted sequence of warped images rebounds back when a user reaches the end of the sequence of warped images) or momentum scrolling (e.g., the outputted sequence of warped images keeps moving after an interact from a user as if friction is slowing it down).

Figure 12:
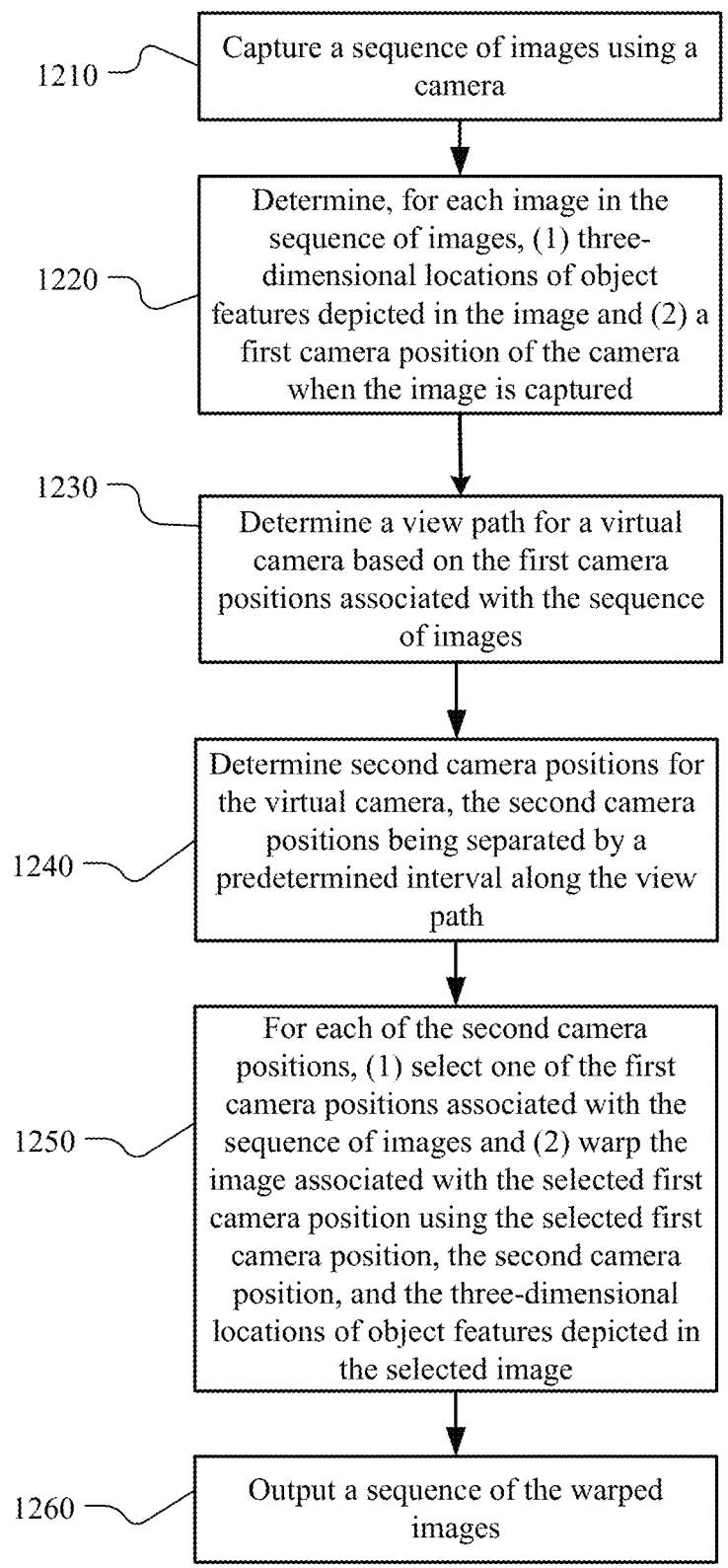
FIG. 12 illustrates an example method for outputting a sequence of warped images from a sequence of captured images.

FIG. 12 illustrates an example method 1200 for outputting a sequence of warped images from a sequence of captured images. The method may begin at step 1210, where a computing system captures a sequence of images using a camera. In particular embodiments the computing system comprises a camera and associated GUI on a wireless device. In particular embodiments, the GUI of wireless device may include one or more user instructions to move the wireless device in a curved path for capturing the sequence of images.

At step 1220, a computing system determines, for each image in the sequence of images, (1) three-dimensional locations of object features depicted in the image and (2) a first camera position of the camera when the image is captured. The three-dimensional locations of object features may correspond to a particular area of an object, such as a corner of a table or particular surface. The camera position may comprise, for example and not by way of limitation, a pose, including the three-dimensional location and orientation (e.g., whether wireless device 210 is facing towards object 220) of the camera located on wireless device 210 when the image in the sequence of images is captured.

At step 1230, the computing system determines a view path for a virtual camera based on the first camera positions associated with the sequence of images. In particular embodiments, determining the view path for the virtual camera comprises generating a spline using the plurality of control points. This spline may be smooth, providing spatial stability and avoiding sudden, jarring movements of the location of as the virtual camera moves throughout a scene.

At step 1240, the computing system determines second camera positions for the virtual camera, the second camera positions being separated by a predetermined interval along the view path. In particular embodiments the virtual camera positions may comprise a pose consisting of at least a three-dimensional location and orientation of the virtual camera. These second camera positions for the virtual camera represent locations along the view path where the computing system generates one or more warped images that are utilized to generate a sequence of warped images.

At step 1250, the computing system, for each of the second viewpoints, (1) selects one of the first camera positions associated with the sequence of images and (2) warps the image associated with the selected first camera position using the selected first camera position, the second camera position, and the three-dimensional locations of object features depicted in the selected image. In particular embodiments the first camera positions associated with the sequence of images is selected by identifying a first camera position that is located at a minimum physical distance virtual camera position.

At step 1260, the computing system outputs a sequence of the warped images. The sequence of warped images may be outputted in a file comprising any format suitable for viewing, including for example, .mp4, .mov, .wmv, .flv, or .avi. In particular embodiments the sequence of warped images may be accessible to one or more users of an online platform, for example, the website of an online retailer or on a social networking system, via a user interface on a wireless device. In particular embodiments the GUI of wireless device may include one or more elements that permit a user of client device to interact with the outputted sequence of warped images. These interactions may include, for example and not by way of limitation, rotating or zooming in on the outputted sequence of warped images.

Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for outputting a sequence of warped images from a sequence of captured images including the particular steps of the method of FIG. 12, this disclosure contemplates any suitable method for outputting a sequence of warped images from a sequence of captured images including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Figure 13:
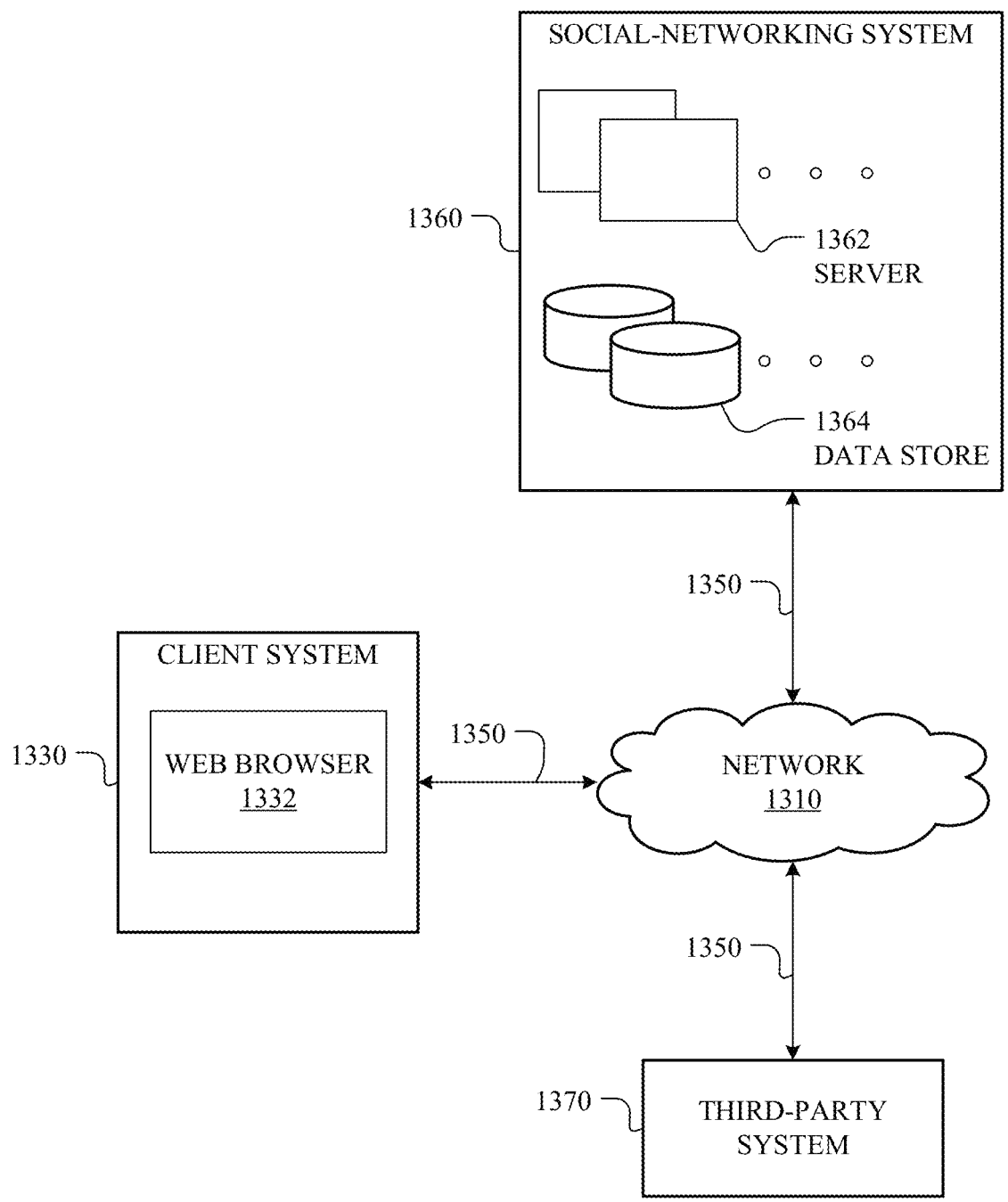
FIG. 13 illustrates an example network environment associated with a social-networking system.

FIG. 13 illustrates an example network environment 1300 associated with a social-networking system. Network environment 1300 includes a client system 1330, a social-networking system 1360, and a third-party system 1370 connected to each other by a network 1310. Although FIG. 13 illustrates a particular arrangement of client system 1330, social-networking system 1360, third-party system 1370, and network 1310, this disclosure contemplates any suitable arrangement of client system 1330, social-networking system 1360, third-party system 1370, and network 1310. As an example and not by way of limitation, two or more of client system 1330, social-networking system 1360, and third-party system 1370 may be connected to each other directly, bypassing network 1310. As another example, two or more of client system 1330, social-networking system 1360, and third-party system 1370 may be physically or logically co-located with each other in whole or in part. Moreover, although FIG. 13 illustrates a particular number of client systems 1330, social-networking systems 1360, third-party systems 1370, and networks 1310, this disclosure contemplates any suitable number of client systems 1330, social-networking systems 1360, third-party systems 1370, and networks 1310. As an example and not by way of limitation, network environment 1300 may include multiple client system 1330, social-networking systems 1360, third-party systems 1370, and networks 1310.

This disclosure contemplates any suitable network 1310. As an example and not by way of limitation, one or more portions of network 1310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1310 may include one or more networks 1310.

Links 1350 may connect client system 1330, social-networking system 1360, and third-party system 1370 to communication network 1310 or to each other. This disclosure contemplates any suitable links 1350. In particular embodiments, one or more links 1350 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1350, or a combination of two or more such links 1350. Links 1350 need not necessarily be the same throughout network environment 1300. One or more first links 1350 may differ in one or more respects from one or more second links 1350.

In particular embodiments, client system 1330 may be an electronic device including hardware, software, or embedded logic components or a combination of two or more such components and capable of carrying out the appropriate functionalities implemented or supported by client system 1330. As an example and not by way of limitation, a client system 1330 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1330. A client system 1330 may enable a network user at client system 1330 to access network 1310. A client system 1330 may enable its user to communicate with other users at other client systems 1330.

In particular embodiments, client system 1330 may include a web browser 1332, and may have one or more add-ons, plug-ins, or other extensions. A user at client system 1330 may enter a Uniform Resource Locator (URL) or other address directing the web browser 1332 to a particular server (such as server 1362, or a server associated with a third-party system 1370), and the web browser 1332 may generate a Hyper Text Transfer Protocol (HTTP) request and communicate the HTTP request to server. The server may accept the HTTP request and communicate to client system 1330 one or more Hyper Text Markup Language (HTML) files responsive to the HTTP request. Client system 1330 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 1360 may be a network-addressable computing system that can host an online social network. Social-networking system 1360 may generate, store, receive, and send social-networking data, such as, for example, user-profile data, concept-profile data, social-graph information, or other suitable data related to the online social network. Social-networking system 1360 may be accessed by the other components of network environment 1300 either directly or via network 1310. As an example and not by way of limitation, client system 1330 may access social-networking system 1360 using a web browser 1332, or a native application associated with social-networking system 1360 (e.g., a mobile social-networking application, a messaging application, another suitable application, or any combination thereof) either directly or via network 1310. In particular embodiments, social-networking system 1360 may include one or more servers 1362. Each server 1362 may be a unitary server or a distributed server spanning multiple computers or multiple datacenters. Servers 1362 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1362 may include hardware, software, or embedded logic components or a combination of two or more such components for carrying out the appropriate functionalities implemented or supported by server 1362. In particular embodiments, social-networking system 1360 may include one or more data stores 1364. Data stores 1364 may be used to store various types of information. In particular embodiments, the information stored in data stores 1364 may be organized according to specific data structures. In particular embodiments, each data store 1364 may be a relational, columnar, correlation, or other suitable database. Although this disclosure describes or illustrates particular types of databases, this disclosure contemplates any suitable types of databases. Particular embodiments may provide interfaces that enable a client system 1330, a social-networking system 1360, or a third-party system 1370 to manage, retrieve, modify, add, or delete, the information stored in data store 1364.

In particular embodiments, social-networking system 1360 may store one or more social graphs in one or more data stores 1364. In particular embodiments, a social graph may include multiple nodes—which may include multiple user nodes (each corresponding to a particular user) or multiple concept nodes (each corresponding to a particular concept)—and multiple edges connecting the nodes. Social-networking system 1360 may provide users of the online social network the ability to communicate and interact with other users. In particular embodiments, users may join the online social network via social-networking system 1360 and then add connections (e.g., relationships) to a number of other users of social-networking system 1360 to whom they want to be connected. Herein, the term "friend" may refer to any other user of social-networking system 1360 with whom a user has formed a connection, association, or relationship via social-networking system 1360.

In particular embodiments, social-networking system 1360 may provide users with the ability to take actions on various types of items or objects, supported by social-networking system 1360. As an example and not by way of limitation, the items and objects may include groups or social networks to which users of social-networking system 1360 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1360 or by an external system of third-party system 1370, which is separate from social-networking system 1360 and coupled to social-networking system 1360 via a network 1310.

In particular embodiments, social-networking system 1360 may be capable of linking a variety of entities. As an example and not by way of limitation, social-networking system 1360 may enable users to interact with each other as well as receive content from third-party systems 1370 or other entities, or to allow users to interact with these entities through an application programming interfaces (API) or other communication channels.

In particular embodiments, a third-party system 1370 may include one or more types of servers, one or more data stores, one or more interfaces, including but not limited to APIs, one or more web services, one or more content sources, one or more networks, or any other suitable components, e.g., that servers may communicate with. A third-party system 1370 may be operated by a different entity from an entity operating social-networking system 1360. In particular embodiments, however, social-networking system 1360 and third-party systems 1370 may operate in conjunction with each other to provide social-networking services to users of social-networking system 1360 or third-party systems 1370. In this sense, social-networking system 1360 may provide a platform, or backbone, which other systems, such as third-party systems 1370, may use to provide social-networking services and functionality to users across the Internet.

In particular embodiments, a third-party system 1370 may include a third-party content object provider. A third-party content object provider may include one or more sources of content objects, which may be communicated to a client system 1330. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1360 also includes user-generated content objects, which may enhance a user's interactions with social-networking system 1360. User-generated content may include anything a user can add, upload, send, or "post" to social-networking system 1360. As an example and not by way of limitation, a user communicates posts to social-networking system 1360 from a client system 1330. Posts may include data such as status updates or other textual data, location information, photos, videos, links, music or other similar data or media. Content may also be added to social-networking system 1360 by a third-party through a "communication channel," such as a newsfeed or stream.

In particular embodiments, social-networking system 1360 may include a variety of servers, sub-systems, programs, modules, logs, and data stores. In particular embodiments, social-networking system 1360 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1360 may also include suitable components such as network interfaces, security mechanisms, load balancers, failover servers, management-and-network-operations consoles, other suitable components, or any suitable combination thereof. In particular embodiments, social-networking system 1360 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1360 to one or more client systems 1330 or one or more third-party system 1370 via network 1310. The web server may include a mail server or other messaging functionality for receiving and routing messages between social-networking system 1360 and one or more client systems 1330. An API-request server may allow a third-party system 1370 to access information from social-networking system 1360 by calling one or more APIs. An action logger may be used to receive communications from a web server about a user's actions on or off social-networking system 1360. In conjunction with the action log, a third-party-content-object log may be maintained of user exposures to third-party-content objects. A notification controller may provide information regarding content objects to a client system 1330. Information may be pushed to a client system 1330 as notifications, or information may be pulled from client system 1330 responsive to a request received from client system 1330. Authorization servers may be used to enforce one or more privacy settings of the users of social-networking system 1360. A privacy setting of a user determines how particular information associated with a user can be shared. The authorization server may allow users to opt in to or opt out of having their actions logged by social-networking system 1360 or shared with other systems (e.g., third-party system 1370), such as, for example, by setting appropriate privacy settings. Third-party-content-object stores may be used to store content objects received from third parties, such as a third-party system 1370. Location stores may be used for storing location information received from client systems 1330 associated with users. Advertisement-pricing modules may combine social information, the current time, location information, or other suitable information to provide relevant advertisements, in the form of notifications, to a user.

Figure 14:
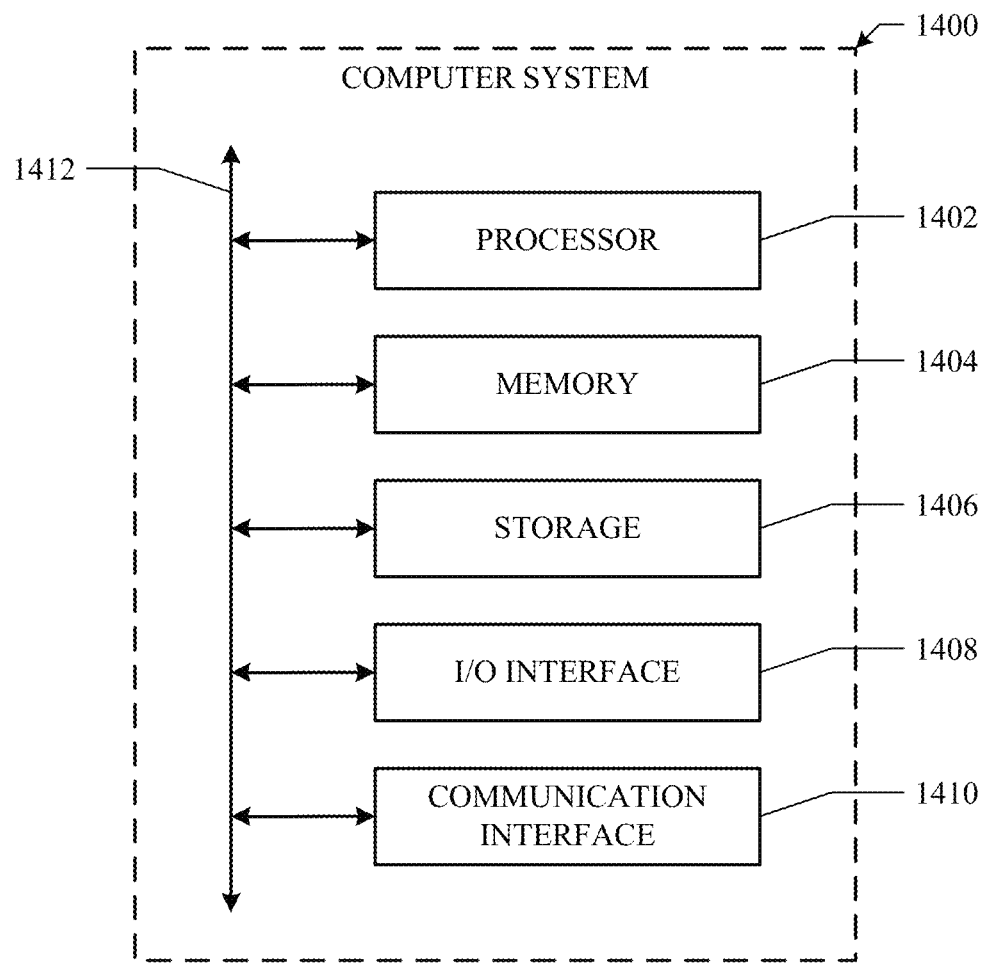
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing system, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
capturing a sequence of images using a camera;
determining, for each image in the sequence of images, (1) three-dimensional locations of object features depicted in the image and (2) a first camera position of the camera when the image is captured;
grouping the three-dimensional locations of object features depicted in the sequence of images into one or more clusters;
determining a view path for a virtual camera based on the first camera positions associated with the sequence of images;
determining second camera positions for the virtual camera, the second camera positions being separated by a predetermined interval along the view path;
for each of the second camera positions:
selecting one of the first camera positions associated with the sequence of images; and
warping the image associated with the selected first camera position using the selected first camera position, the second camera position, and one or more of the three-dimensional locations of object features depicted in the selected image associated with the selected first camera position, wherein the one or more of the three-dimensional locations of object features used for the warping the selected image are each determined to be within a threshold distance of one of the one or more clusters; and
outputting a sequence of the warped images.

2. The method of claim 1, further comprising:
determining a plurality of control points based on the first camera positions associated with the sequence of images;
wherein determining the view path for the virtual camera comprises generating a spline using the plurality of control points.

3. The method of claim 1, further comprising:
detecting a gap between (1) the first camera positions associated with a first continuous subset of the sequence of images and (2) the first camera positions associated with a second continuous subset of the sequence of images;
adjusting the first camera positions associated with the second continuous subset of the sequence of images to close the gap;
wherein determining the view path for the virtual camera is based on at least the first camera positions associated with the first continuous subset of the sequence of images and the adjusted first camera positions associated with the second continuous subset of the sequence of images.

4. The method of claim 1, further comprising:
determining, for each of the second camera positions, a corresponding focus point, wherein the focus points are determined based in part on optimizing (1) a smoothness of a path corresponding to the focus points and (2) distances between the second camera positions and their respective focus points to be close to a predetermined target distance;
wherein for each of the second camera positions, warping of the image associated with the selected first camera position for that second camera position further uses the focus point corresponding to that second camera position.

5. The method of claim 1, wherein the sequence of images is captured via a user interface on a wireless device, the user interface comprising user instructions to move the wireless device in a curved path for capturing the sequence of images.

6. The method of claim 1, wherein for each of the second camera positions, warping the image associated with the selected first camera position comprises:
generating a mesh corresponding to the image associated with the selected first camera position;
projecting, based on at least the selected first camera position, the three-dimensional locations of object features depicted in the image onto the mesh to generate a first set of projected points;
projecting, based on at least the second camera position, the three-dimensional locations of object features depicted in the image to generate a second set of projected points;
generating a warped mesh based on the first set of projected points and the second set of projected points; and
generating the warped image based on the image associated with the selected first camera position and the warped mesh.

7. The method of claim 1, further comprising:
determining scaling factors for scaling the sequence of the warped images to satisfy a target resolution; and
in response to determining that the scaling factors exceed a predetermined failing threshold, generate an error message.

8. The method of claim 1, further comprising:
determining scaling factors for scaling the sequence of the warped images to satisfy a target resolution; and in response to determining that the scaling factors are within a predetermined acceptable range:
  scale the sequence of the warped images according to the scaling factors;
  identifying missing pixel information in the scaled sequence of the warped images; and
  in-painting the missing pixel information.

9. The method of claim 1, further comprising:
determining scaling factors for scaling the sequence of the warped images to satisfy a target resolution; and
in response to determining that the scaling factors are below a predetermined threshold:
  scale the sequence of the warped images according to the scaling factors; and
  crop the scaled sequence of the warped images to satisfy the target resolution.

10. One or more computer-readable non-transitory storage media embodying software that is operable when executed to:
capture a sequence of images using a camera;
determine, for each image in the sequence of images, (1) three-dimensional locations of object features depicted in the image and (2) a first camera position of the camera when the image is captured;
group the three-dimensional locations of object features depicted in the sequence of images into one or more clusters;
determine a view path for a virtual camera based on the first camera positions associated with the sequence of images;
determine second camera positions for the virtual camera, the second camera positions being separated by a predetermined interval along the view path;
for each of the second camera positions:
  select one of the first camera positions associated with the sequence of images; and
  warp the image associated with the selected first camera position using the selected first camera position, the second camera position, and one or more of the three-dimensional locations of object features depicted in the selected image associated with the selected first camera position, wherein the one or more of the three-dimensional locations of object features used for the warping the selected image are each determined to be within a threshold distance of one of the one or more clusters; and
output a sequence of the warped images.

11. The media of claim 10, wherein the software is further operable when executed to:
determine a plurality of control points based on the first camera positions associated with the sequence of images;
wherein determining the view path for the virtual camera comprises generating a spline using the plurality of control points.

12. The media of claim 10, wherein the software is further operable when executed to:
detect a gap between (1) the first camera positions associated with a first continuous subset of the sequence of images and (2) the first camera positions associated with a second continuous subset of the sequence of images;
adjust the first camera positions associated with the second continuous subset of the sequence of images to close the gap;
wherein determining the view path for the virtual camera is based on at least the first camera positions associated with the first continuous subset of the sequence of images and the adjusted first camera positions associated with the second continuous subset of the sequence of images.

13. A system comprising:
one or more processors; and
one or more computer-readable non-transitory storage media coupled to one or more of the processors and comprising instructions operable when executed by one or more of the processors to cause the system to:
capture a sequence of images using a camera;
determine, for each image in the sequence of images, (1) three-dimensional locations of object features depicted in the image and (2) a first camera position of the camera when the image is captured;
group the three-dimensional locations of object features depicted in the sequence of images into one or more clusters;
determine a view path for a virtual camera based on the first camera positions associated with the sequence of images;
determine second camera positions for the virtual camera, the second camera positions being separated by a predetermined interval along the view path;
for each of the second camera positions:
  select one of the first camera positions associated with the sequence of images; and
  warp the image associated with the selected first camera position using the selected first camera position, the second camera position, and one or more of the three-dimensional locations of object features depicted in the selected image associated with the selected first camera position, wherein the one or more of the three-dimensional locations of object features used for the warping the selected image are each determined to be within a threshold distance of one of the one or more clusters; and
output a sequence of the warped images.

14. The system of claim 13, wherein the one or more processors are further operable when executing the instructions to perform operations comprising:
determining a plurality of control points based on the first camera positions associated with the sequence of images;
wherein determining the view path for the virtual camera comprises generating a spline using the plurality of control points.

15. The system of claim 13, wherein the one or more processors are further operable when executing the instructions to perform operations comprising:
detecting a gap between (1) the first camera positions associated with a first continuous subset of the sequence of images and (2) the first camera positions associated with a second continuous subset of the sequence of images;
adjusting the first camera positions associated with the second continuous subset of the sequence of images to close the gap;
wherein determining the view path for the virtual camera is based on at least the first camera positions associated with the first continuous subset of the sequence of images and the adjusted first camera positions associated with the second continuous subset of the sequence of images.

16. The method of claim 1, further comprising:
determining, for each of the second camera positions, a corresponding focus point, wherein the focus points are determined based in part on optimizing (1) a smoothness of a path corresponding to the focus points and (2) a compactness of the focus points;

wherein for each of the second camera positions, warping the image associated with the selected first camera position for that second camera position further uses the focus point corresponding to the second camera position.

17. The media of claim 10, wherein the software is further operable when executed to:

determine, for each of the second camera positions, a corresponding focus point, wherein the focus points are determined based in part on optimizing (1) a smoothness of a path corresponding to the focus points and (2) a compactness of the focus points;

wherein for each of the second camera positions, warping the image associated with the selected first camera position for that second camera position further uses the focus point corresponding to the second camera position.

18. The system of claim 13, wherein the one or more processors are further operable when executing the instructions to:

determine, for each of the second camera positions, a corresponding focus point, wherein the focus points are determined based in part on optimizing (1) a smoothness of a path corresponding to the focus points and (2) a compactness of the focus points;

wherein for each of the second camera positions, warping the image associated with the selected first camera position for that second camera position further uses the focus point corresponding to the second camera position.

19. The media of claim 10, wherein the software is further operable when executed to:

determine, for each of the second camera positions, a corresponding focus point, wherein the focus points are determined based in part on optimizing (1) a smoothness of a path corresponding to the focus points and (2) distances between the second camera positions and their respective focus points to be close to a predetermined target distance;

wherein for each of the second camera positions, warping of the image associated with the selected first camera position for that second camera position further uses the focus point corresponding to that second camera position.

20. The system of claim 13, wherein the one or more processors are further operable when executing the instructions to:

determine, for each of the second camera positions, a corresponding focus point, wherein the focus points are determined based in part on optimizing (1) a smoothness of a path corresponding to the focus points and (2) distances between the second camera positions and their respective focus points to be close to a predetermined target distance;

wherein for each of the second camera positions, warping of the image associated with the selected first camera position for that second camera position further uses the focus point corresponding to that second camera position.

* * * * *